(12) United States Patent
Fujisaki

(10) Patent No.: US 7,990,624 B2
(45) Date of Patent: Aug. 2, 2011

(54) ZOOM LENS AND IMAGE PICKUP APPARATUS HAVING THE SAME

(75) Inventor: Toyokatsu Fujisaki, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 95 days.

(21) Appl. No.: 12/471,254

(22) Filed: May 22, 2009

(65) Prior Publication Data

US 2009/0290216 A1    Nov. 26, 2009

(30) Foreign Application Priority Data

May 26, 2008  (JP) ................................. 2008-136616

(51) Int. Cl.
G02B 15/14    (2006.01)
(52) U.S. Cl. ........ 359/687; 359/676; 396/72; 348/240.3
(58) Field of Classification Search .................. 359/676, 359/683, 685, 686, 687; 396/72–88; 348/240.99–240.3, 335–369
See application file for complete search history.

(56) References Cited

U.S. PATENT DOCUMENTS

| | | |
|---|---|---|
| 5,530,592 A | 6/1996 | Tochigi |
| 6,266,189 B1 | 7/2001 | Konno |
| 7,190,529 B2 | 3/2007 | Miyajima |
| 7,199,940 B2 * | 4/2007 | Obama et al. .................. 359/683 |
| 7,206,137 B2 | 4/2007 | Nakatani |
| 2009/0135485 A1 * | 5/2009 | Ohtake .......................... 359/557 |
| 2009/0141350 A1 * | 6/2009 | Bito et al. ...................... 359/557 |
| 2009/0190234 A1 * | 7/2009 | Sato ............................... 359/684 |

FOREIGN PATENT DOCUMENTS

| | | |
|---|---|---|
| JP | 10-232420 A | 9/1998 |
| JP | 2002-244037 A | 8/2002 |

* cited by examiner

*Primary Examiner* — Darryl J Collins
(74) *Attorney, Agent, or Firm* — Canon USA, Inc. IP Div

(57) ABSTRACT

A zoom lens includes a first, third and fourth lens group of positive refracting power, a second lens group of negative refracting power, wherein, during zooming from a wide-angle end to a telephoto end, at least the first lens group moves, wherein the third lens group includes, a first lens sub-group of positive refracting power and a second lens sub-group of negative refracting power, wherein the second lens sub-group includes a single negative lens, wherein the first lens sub-group of the third lens group is moved to keep a perpendicular component relative to an optical axis to correct image blur to be produced when the zoom lens vibrates, and wherein, when a focal length of the first lens group is denoted by f1 and the focal length of the whole system at the wide-angle end is denoted by fw, a conditional expression $10.0 < f1/fw < 20.0$ is satisfied.

21 Claims, 13 Drawing Sheets

ZOOM LENS AND IMAGE PICKUP APPARATUS HAVING THE SAME

FIELD OF THE INVENTION AND RELATED ART

This invention relates to a zoom lens and an image pickup apparatus having the same. The present invention is suitably applicable to a video camera, electronic still camera, TV camera (broadcast camera), and silversalt photographic camera, for example.

In recent years, the image pickup apparatus such as a video camera, digital still camera or broadcast camera using a solid-state image pickup device, or a camera using a silver film, has been designed to have a higher function and smaller size.

With regard to the photographic optical system to be used in such image pickup apparatus, it is required that the lens overall length is short and compact, the zoom ratio is high and the resolution is high throughout the whole zoom range.

As a zoom lens which meets these requirements, there is a zoon lens called a rear focus type in which the focusing is carried out by moving a lens group or groups other than the first lens group which is placed closest to the object side.

Generally, as compared with the front focus type zoom lens in which the first lens group is moved to perform the focusing, the rear focus type zoom lens has an advantage that, since the effective diameter of the first lens group can be made smaller, reduction in size of the whole lens system is easy. Furthermore, the macro-photography is easy. Moreover, since the focusing is carried out by moving a lens group which is small in size and light in weight, the driving force for the lens group is small and quick focusing is possible.

As such rear focus type zoom lens, there is a four-group zoom lens which is comprised of, in an order from the object side to the image side, a first lens group of positive refracting power, a second lens group of negative refracting power, a third lens group of positive refracting power, and a fourth lens group of positive refracting power.

U.S. Pat. Nos. 7,206,137 and 7,190,529 show a four-group zoom lens in which all the lens groups are moved to perform the zooming.

As a rear focus type zoom lens, there is a five-group zoom lens which is comprised of, in an order from the object side to the image side, first to fifth lens groups having positive, negative, positive, positive and positive refracting powers, respectively.

U.S. Pat. No. 5,530,592 shows a five-group zoom lens in which the second and third lens groups are moved for the zooming, while the image plane change due to the power change is corrected by moving the fourth lens group. Furthermore, the focusing is carried out by moving the fourth lens group.

On the other hand, if vibration occurs in the zoom lens when a photogenic subject is being photographed, it results in blurring in the image photographed. In consideration of this, various zoom lenses having a vibration control function for correcting the blur of the photographed image have been proposed.

Among these proposals, there is a four-group zoom lens in which the third lens group is comprised of two lens groups one of which is oscillated in a direction perpendicular to the optical axis (Japanese Laid-Open Patent Application No. 10-232420, U.S. Pat. No. 6,266,189 and Japanese Laid-Open Patent Application No. 2002-244037).

Generally, in order to reduce the size of a zoom lens, the number of the lenses constituting the zoom lens should be decreased while strengthening the refracting power of each lens group. However, in such zoom lens, the lens thickness increases with the increase of the refracting power of each lens surface. Thus, the length shortening effect of the whole lens system becomes insufficient on one hand and the correction of aberrations becomes difficult on the other hand.

Furthermore, with the increase of the zoom-ratio, the assembling error such as tilt of each lens or each lens group during the assembling will increase. If the sensitivity by decentration of the lens and lens group is large, the optical performance degrades largely with the decentration and this causes considerable deterioration of the optical performance during the vibration control. In consideration of this, in the zoom lens the sensitivity by decentration of each lens and each lens group should be made as small as possible.

In the zoom lens of Japanese Laid-Open Patent Application No. 10-232420, the first lens group and the third lens group are fixed relative to the image plane during the zooming. Thus, as compared with the configuration in which the first lens group moves to perform the variation change, the front lens diameter and the lens overall length have to be made larger. If the refracting power of each lens group is made larger (stronger) for reduction in size of the whole system, the sensitivity by decentration becomes larger. This causes degradation of the optical performance due to production errors or degradation of optical performance during the vibration control. It is very difficult to correct these.

In the zoom lens of U.S. Pat. No. 6,266,189, all lens groups are moved for the zooming. Also, the third lens group is comprised of a fore group of positive refracting power and a rear group of negative refracting power. The fore group is moved in a direction perpendicular to the optical axis to perform the vibration control. The fore group is comprised of a single piece of lens, and the rear group is comprised of three pieces of lenses.

In U.S. Pat. No. 6,266,189, if the movement amount of the fore group in the perpendicular direction during the vibration control is to be made small while assuring higher zoom ratio, the refracting power of the fore group has to be made large. Since the fore group is comprised of a single piece of lens, mainly the correction of spherical aberration or comatic aberration becomes difficult. If to the contrary the positive refracting power of the fore group is made weak, the movement amount in the perpendicular direction during the vibration control becomes large. As a result, the effective diameter of the third lens group increases which makes the compactification difficult. Furthermore, deterioration of the optical performance by decentration becomes quite large.

Furthermore, if the number of lenses of the fore group is increased to compensate the deterioration of the optical performance during the vibration control, the total lens number of the third lens group increases, which makes the compactification difficult.

In the four-group zoom lens and five-group zoom lens described above, in order to obtain good optical performance while assuring a high zoom ratio and reduction in size of the whole lens system, it is very important to set the refracting power and the lens structure of each lens group as well as the movement condition during the zooming of each lens group appropriately.

Particularly, in order to assure smaller decentration aberration and good optical performance during the vibration control, it is very important to set the lens structure and the like of the third lens group including a vibration control lens group appropriately.

If these structures are not suitably set, it becomes very difficult to maintain high optical performance during the vibration control while securing a high zoom ratio.

SUMMARY OF THE INVENTION

The present invention provides a zoom lens and/or an image pickup apparatus having the same by which at least one of the inconveniences mentioned above can be removed or reduced.

In accordance with an aspect of the present invention, there is provided a zoom lens comprising: a first lens group of positive refracting power; a second lens group of negative refracting power; a third lens group of positive refracting power; and a fourth lens group of positive refracting power, wherein said first to fourth lens groups are provided in this order from an object side to an image side, wherein, during zooming from a wide-angle end to a telephoto end, at least said first lens group moves, wherein said third lens group includes, in an order from the object side to the image side, a first lens sub-group of positive refracting power and a second lens sub-group of negative refracting power, wherein said second lens sub-group of said third lens group is comprised of a single negative lens, wherein said first lens sub-group of said third lens group is moved to keep a perpendicular component relative to an optical axis to correct image blur to be produced when said zoom lens vibrates, and wherein, when a focal length of said first lens group is denoted by f1 and a the focal length of the whole system at the wide-angle end is denoted by fw, a conditional expression $$10.0 < f1/fw < 20.0$$

is satisfied.

When a focal length of said first lens sub-group of said third lens group is denoted by f3a and a focal length of said fourth lens group is denoted by f4, a conditional expression $$0.3 < f3a/f4 < 0.8$$

is satisfied

When a focal length of said first lens sub-group of said third lens group is denoted by f3a and a focal length of said second lens sub-group of said third lens group is denoted by f3b, a conditional expression $$-0.6 < f3a/f3b < -0.1$$

is satisfied

When focal lengths of said first and third lens groups are denoted by f1 and f3, a conditional expression $$2.5 < f1/f3 < 4.5$$

is satisfied.

When focal lengths of said third and fourth lens groups are denoted by f3 and f4, a conditional expression $$0.2 < f3/f4 < 1.0$$

is satisfied.

When the focal length of the whole system at the wide-angle end and the telephoto end is denoted by fw and ft, respectively, a conditional expression $$18.0 < ft/fw < 40.0$$

is satisfied.

The first lens sub-group of said third lens group includes at least two pieces of positive lenses and one piece of negative lens.

The first lens group is comprised of three lenses which are, in an order from the object side to the image side, a negative lens, a positive lens and a positive lens.

The second lens group is comprised of four lenses which are, in an order from the object side to the image side, a negative lens, a negative lens, a negative lens and a positive lens.

The second lens sub-group of said third lens group is comprised of a single negative lens having a meniscus shape.

The fourth lens group is comprised of one piece of positive lens or a cemented lens having a positive lens and a negative lens cemented to each other.

The zoom lens may further comprise a fifth lens group of positive refracting power provided at the image side of said fourth lens group, wherein said fifth said lens group is held stationary during the zooming.

The first lens sub-group of said third lens group is comprised of, in an order from the object side to the image side, a positive lens, a negative lens with a surface of concave shape at the image side, and a positive lens.

The first lens sub-group of said third lens group is comprised of, in an order from the object side to the image side, a positive lens, a negative lens with a surface of concave shape at the image side, and a cemented lens having a positive lens and a negative lens cemented to each other.

In accordance with another aspect of the present invention, there is provided an image pickup apparatus comprising: a zoom lens as recited above; and a solid-state image pickup device configured to receive an image formed by said zoom lens.

In summary, the present invention provides a zoom lens with a vibration control function by which the whole optical system can be made small in size and, yet, a good pictorial image can be maintained during the vibration compensation.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of zoom lens and image pickup apparatus having the same according to the present invention will now be described with reference to the attached drawings.

A zoom lens of the present invention comprises, in an order from the object side to the image side, a first lens group of positive refracting power, a second lens group of negative refracting power, a third lens group of positive refracting power, and a fourth lens group of positive refracting power.

There may be a fifth lens group of positive refracting power at the image side of the fourth lens group.

The zoom lens is configured so that, for the zooming from the wide-angle end to the telephoto end, at least the first lens group moves.

In the embodiments to be described below, first to fourth lens groups move. The third lens group is comprised of, in an order from the object side to the image side, a "$3a$-th" lens group L$3a$ of positive refracting power for vibration control and a "$3b$-th" lens group L$3b$ of negative refracting power. The "$3b$-th" lens group L$3b$ is comprised of a single negative lens.

The "$3a$-th" lens group L$3a$ is moved so as to keep a perpendicular component relative to the optical axis to shift the pictorial image in a direction perpendicular to the optical axis. This is done to correct the blurring of the pictorial image.

Figure 1:
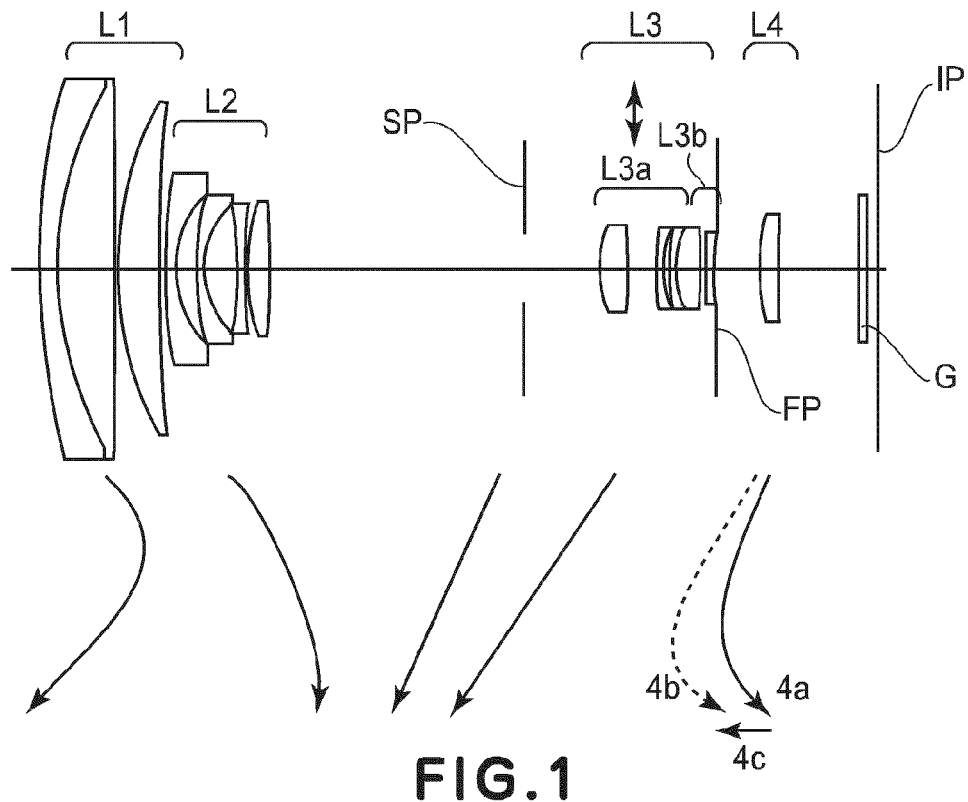
FIG. 1 is a sectional view of a zoom lens at the wide-angle end, according to a first embodiment of the present invention.
Figure 2A:
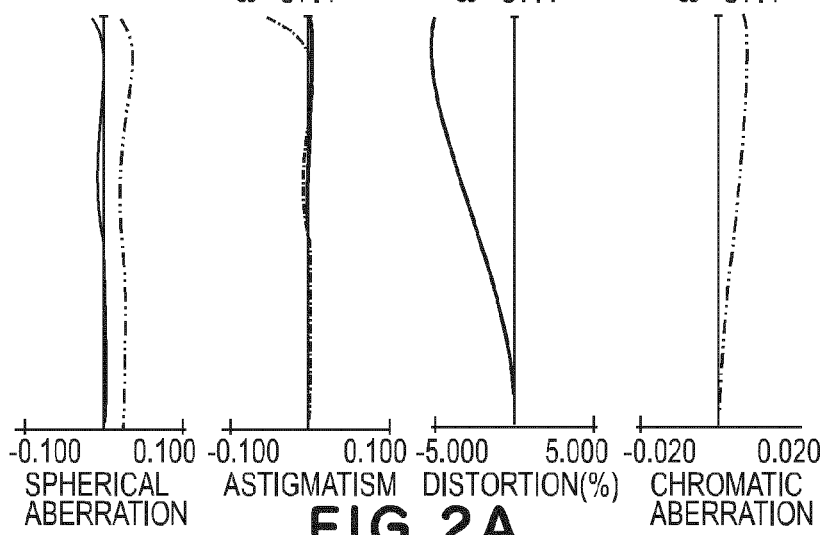
FIG. 2A through FIG. 2C are aberration diagrams of numerical example 1 corresponding to the first embodiment of the present invention.
Figure 2B:
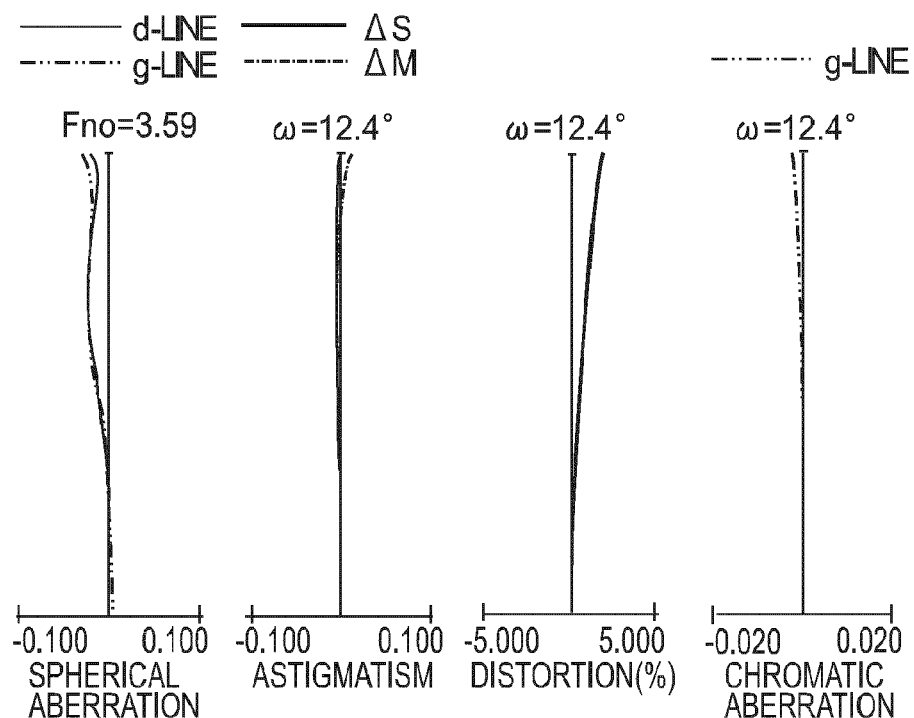
Figure 2C:
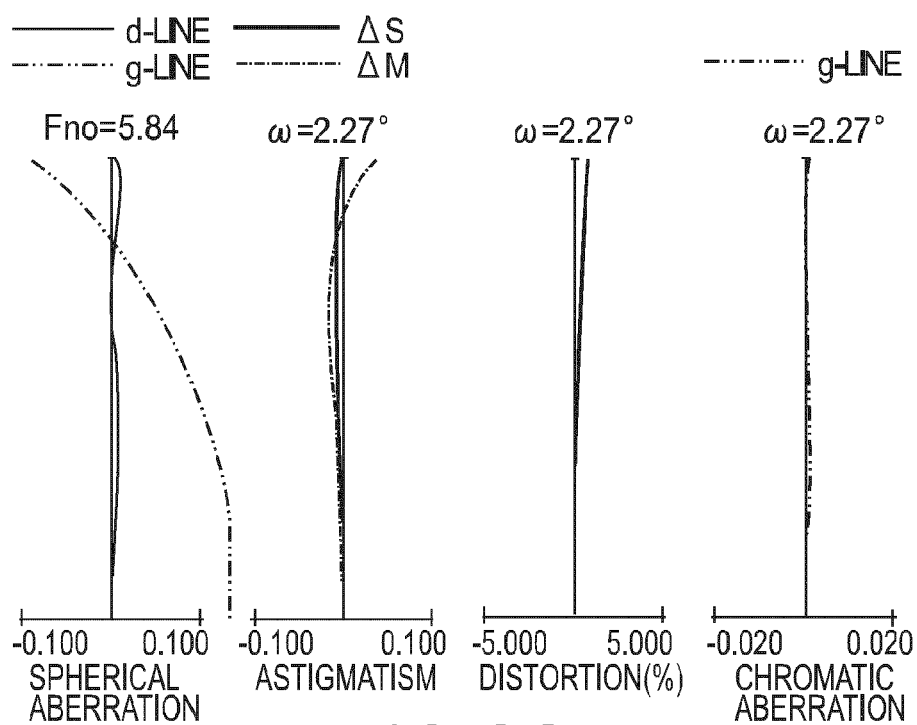

FIG. 1 is a sectional view of a zoom lens at the wide-angle end (short focal-length end), according to a first embodiment of the present invention. FIG. 2A, FIG. 2B and FIG. 2C are aberration diagrams of the zoom lens of the first embodiment at the wide-angle end, the intermediate zooming position and the telephoto end (long focal-length end), respectively.

Figure 3:
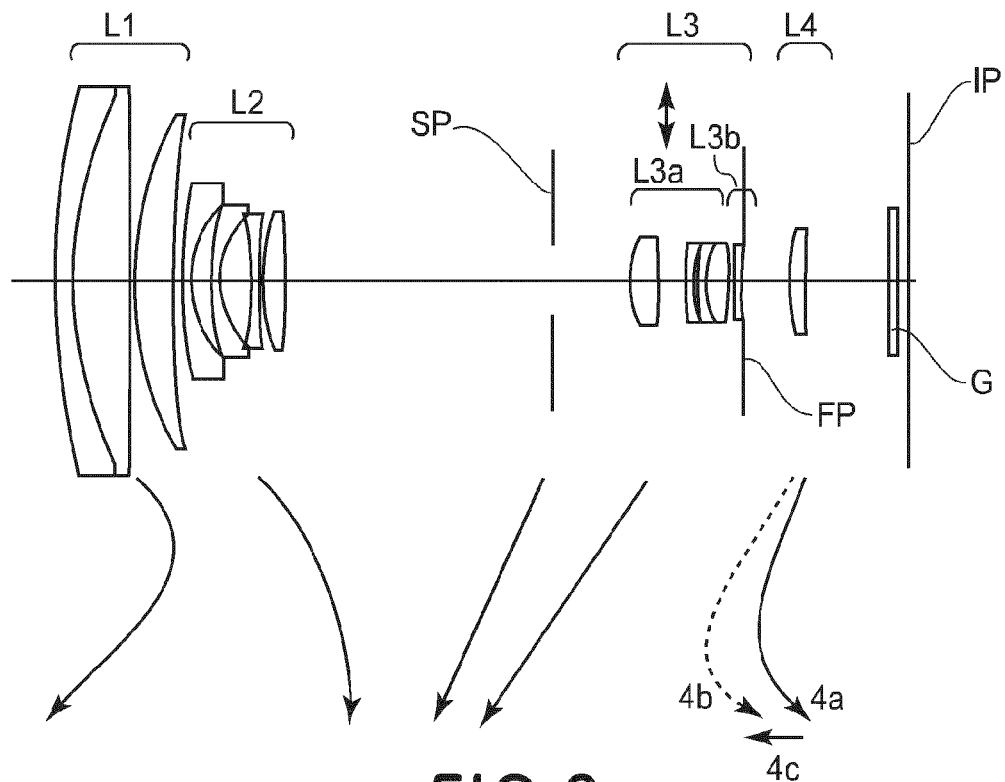
FIG. 3 is a sectional view of a zoom lens at the wide-angle end, according to a second embodiment of the present invention.
Figure 4A:
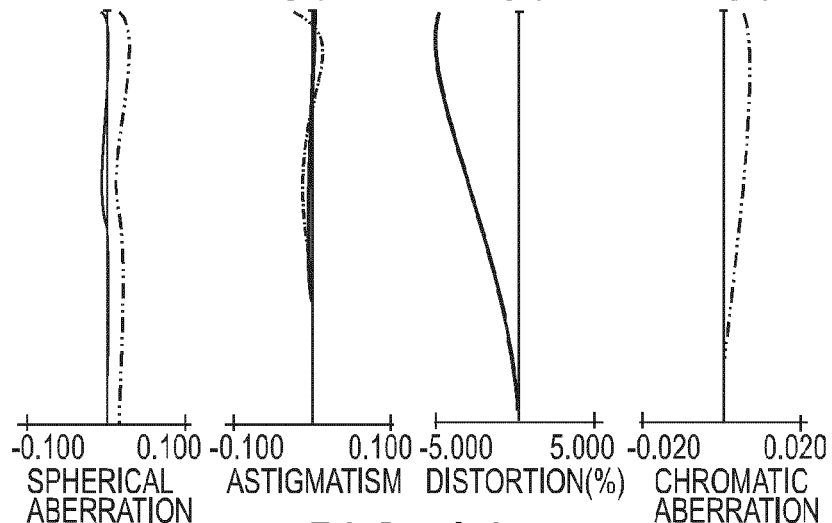
FIG. 4A through FIG. 4C are aberration diagrams of numerical example 2 corresponding to the second embodiment of the present invention.
Figure 4B:
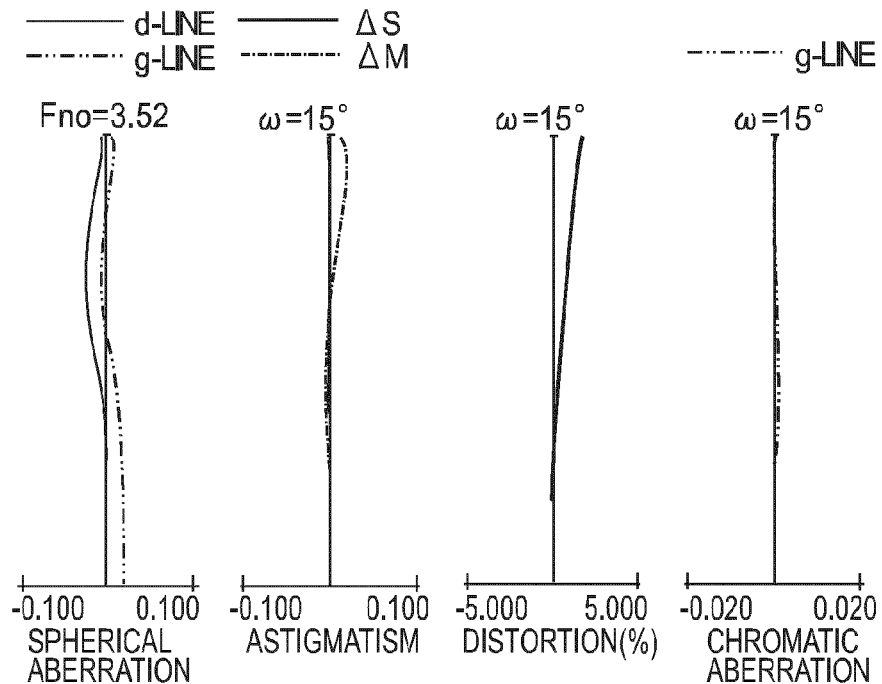
Figure 4C:
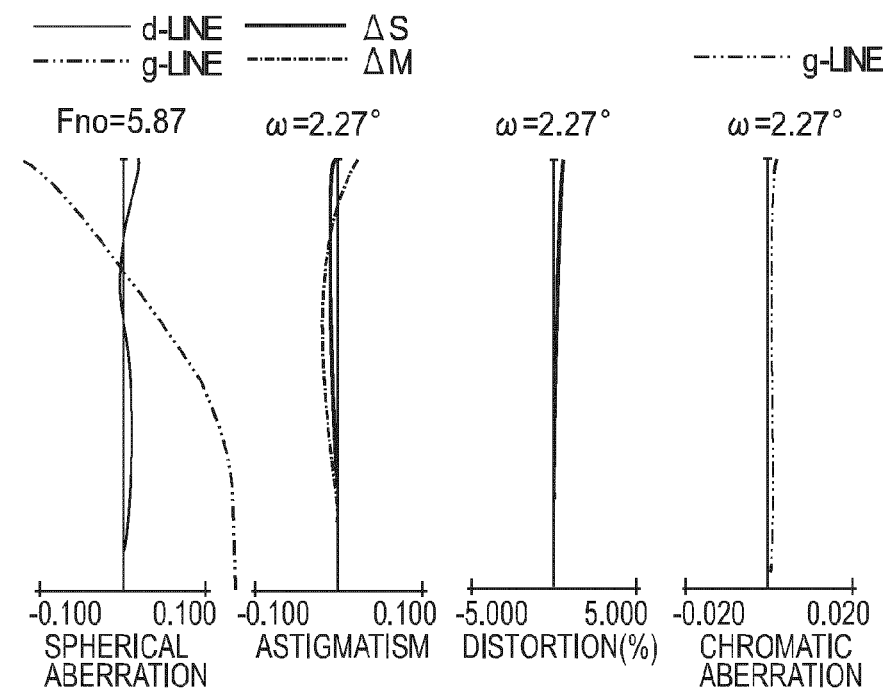

FIG. 3 is a sectional view of a zoom lens at the wide-angle end, according to a second embodiment of the present invention. FIG. 4A, FIG. 4B and FIG. 4C are aberration diagrams of the zoom lens of the second embodiment at the wide-angle end, the intermediate zooming position and the telephoto end, respectively.

Figure 5:
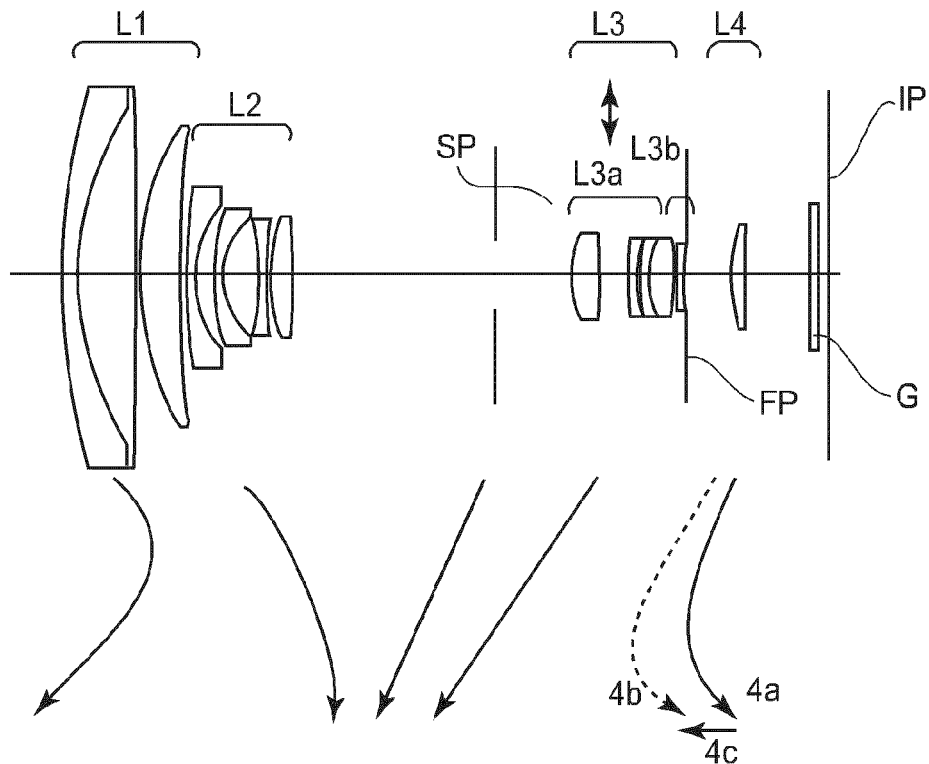
FIG. 5 is a sectional view of a zoom lens at the wide-angle end, according to a third embodiment of the present invention.
Figure 6A:
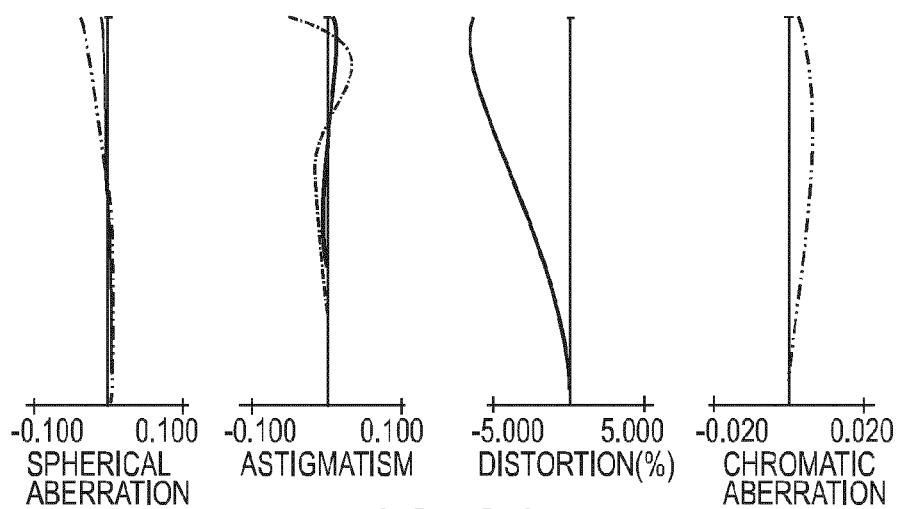
FIG. 6A through FIG. 6C are aberration diagrams of numerical example 4 corresponding to the third embodiment of the present invention.
Figure 6B:
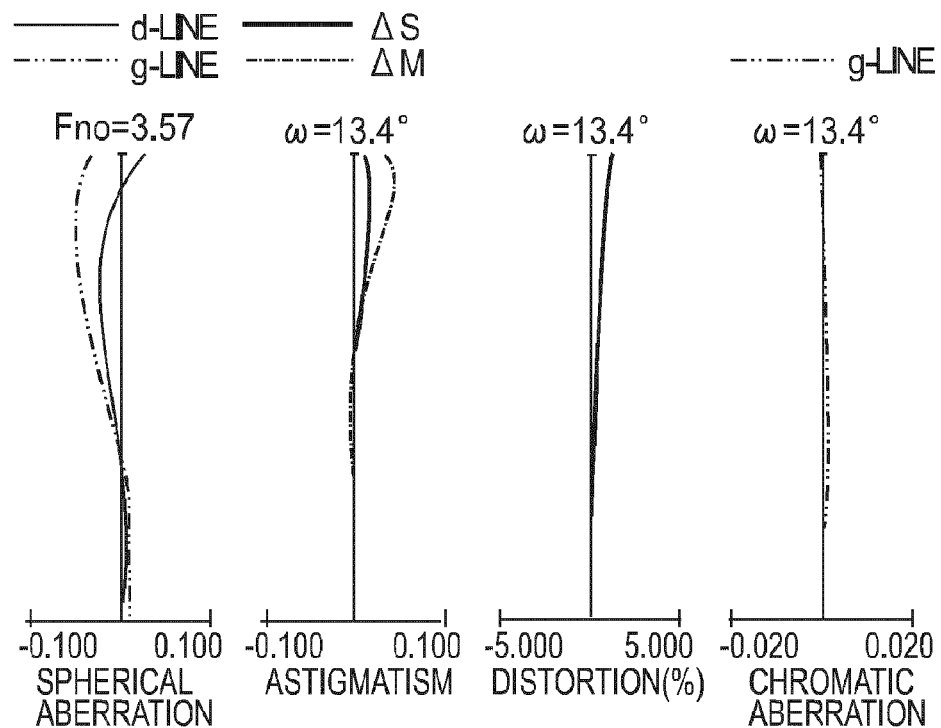
Figure 6C:
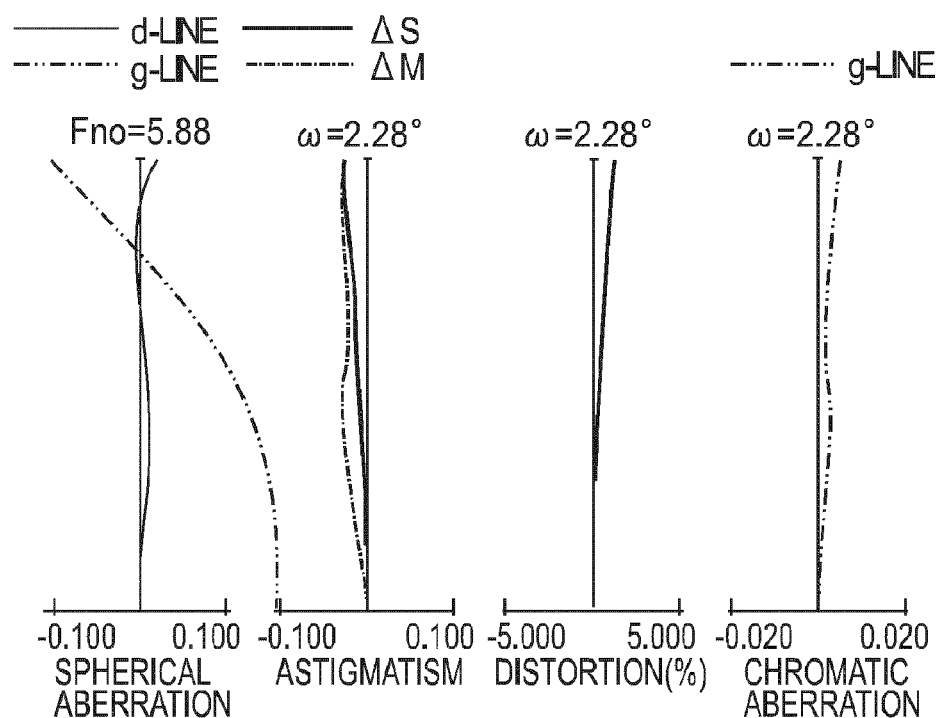

FIG. 5 is a sectional view of a zoom lens at the wide-angle end, according to a third embodiment of the present invention. FIG. 6A, FIG. 6B and FIG. 6C are aberration diagrams of the zoom lens of the second embodiment at the wide-angle end, the intermediate zooming position and the telephoto end, respectively.

Figure 7:
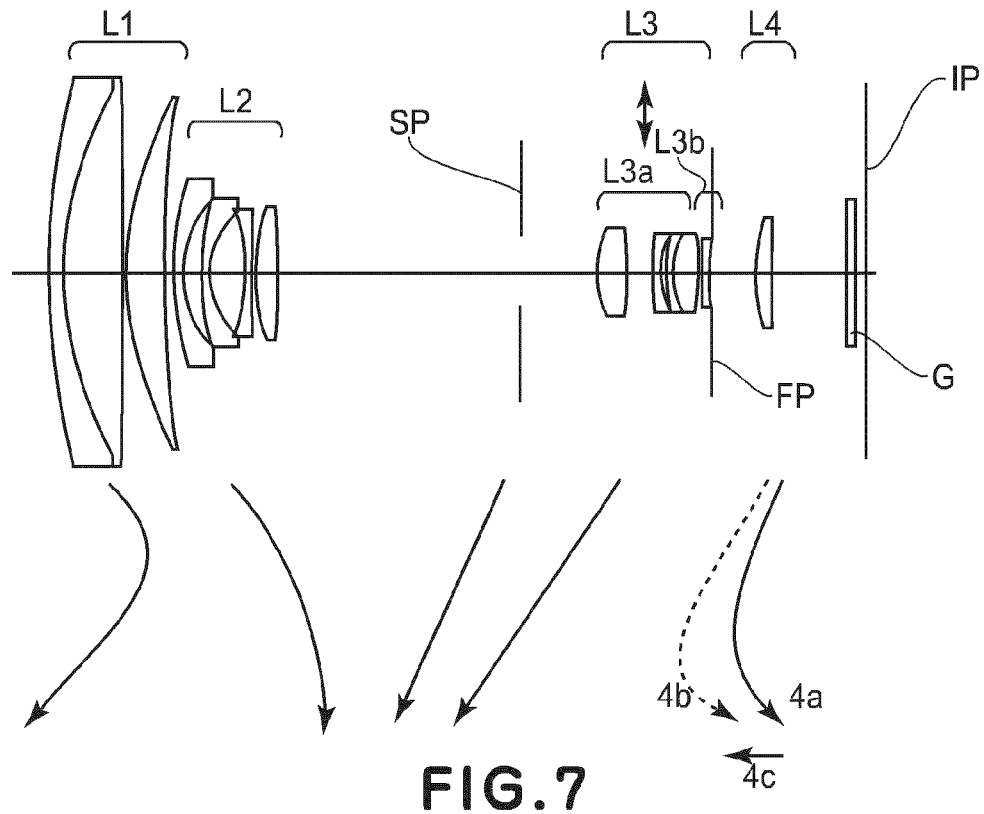
FIG. 7 is a sectional view of a zoom lens at the wide-angle end, according to a fourth embodiment of the present invention.
Figure 8A:
FIG. 8A through FIG. 8C are aberration diagrams of numerical example 4 corresponding to the fourth embodiment of the present invention.
Figure 8A:
Figure 8A:
Figure 8A:
Figure 8B:
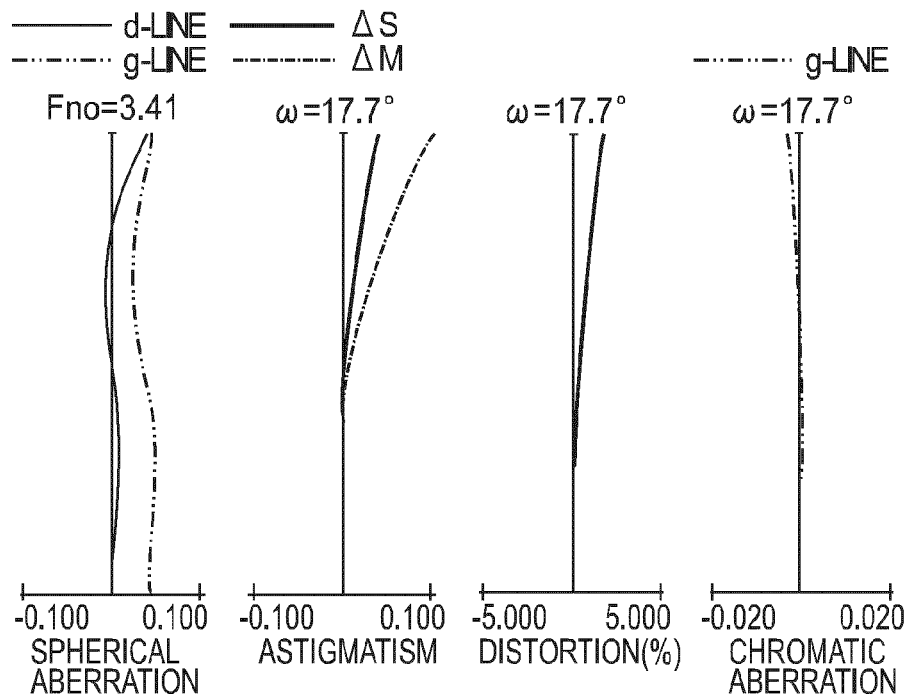
Figure 8C:
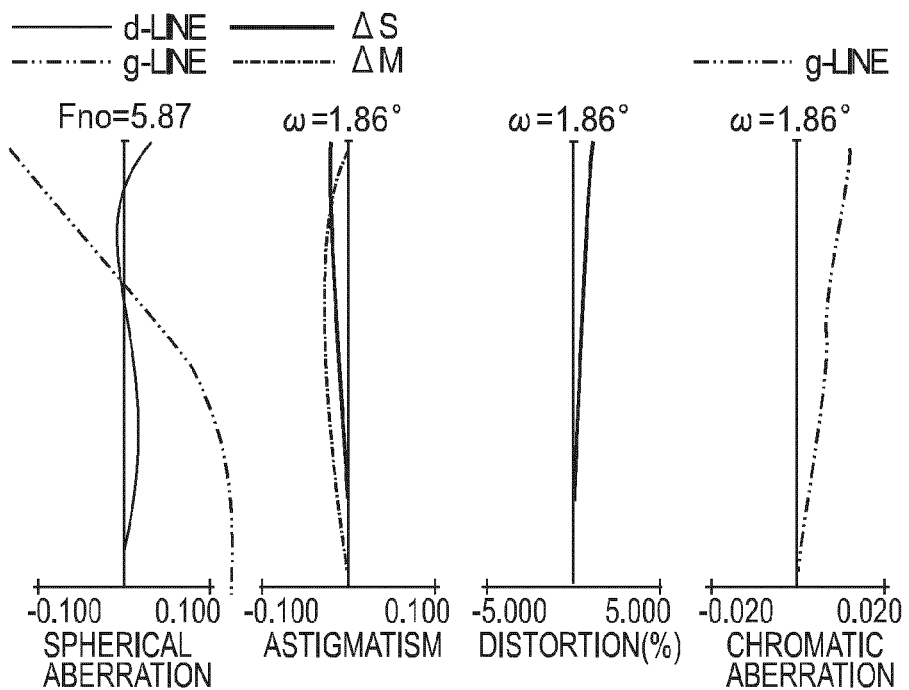

FIG. 7 is a sectional view of a zoom lens at the wide-angle end, according to a fourth embodiment of the present invention. FIG. 8A, FIG. 8B and FIG. 8C are aberration diagrams of the zoom lens of the fourth embodiment at the wide-angle end, the intermediate zooming position and the telephoto end, respectively.

Figure 9:
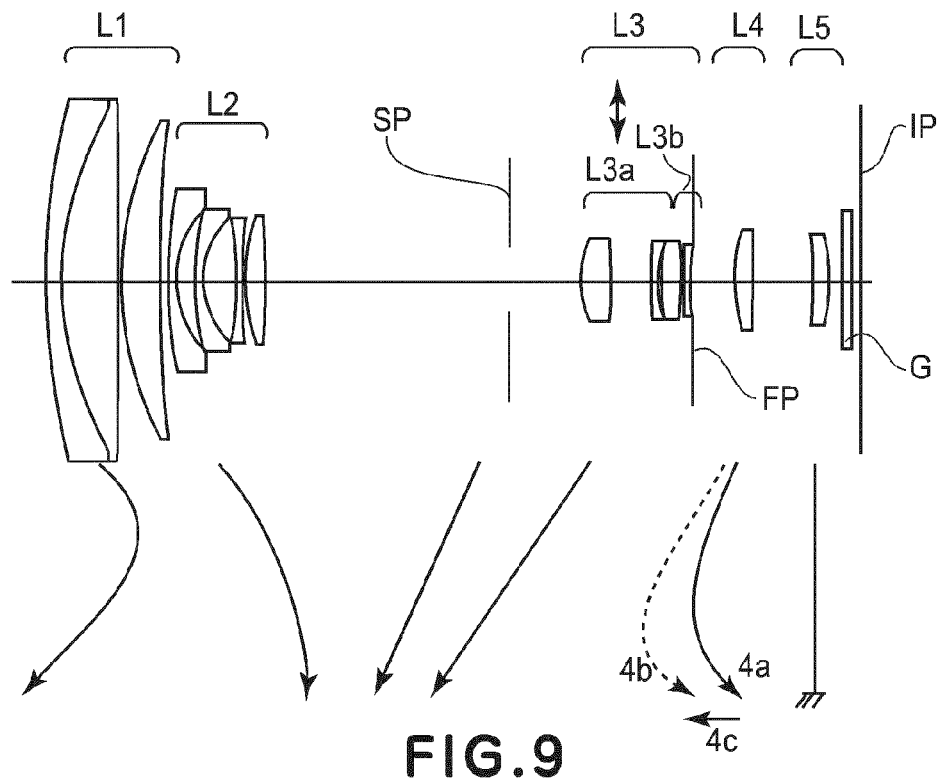
FIG. 9 is a sectional view of a zoom lens at the wide-angle end, according to a fifth embodiment of the present invention.
Figure 10A:
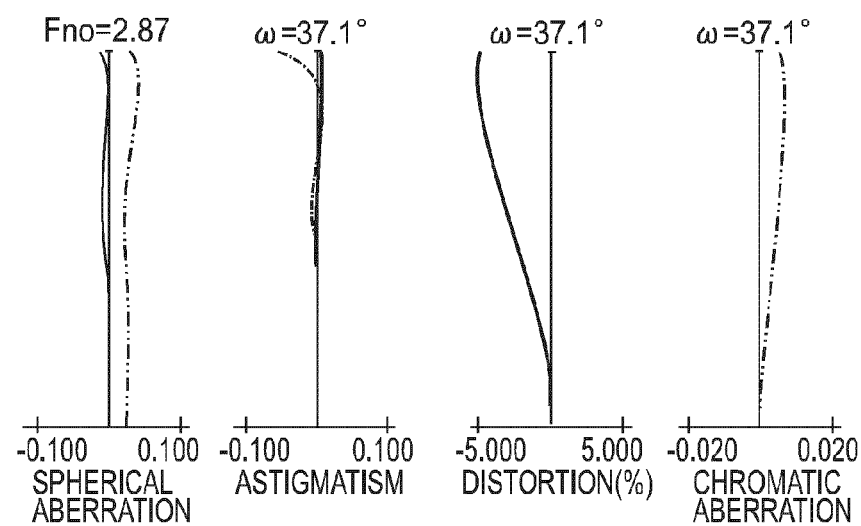
FIG. 10A through FIG. 10C are aberration diagrams of numerical example 5 corresponding to the fifth embodiment of the present invention.
Figure 10B:
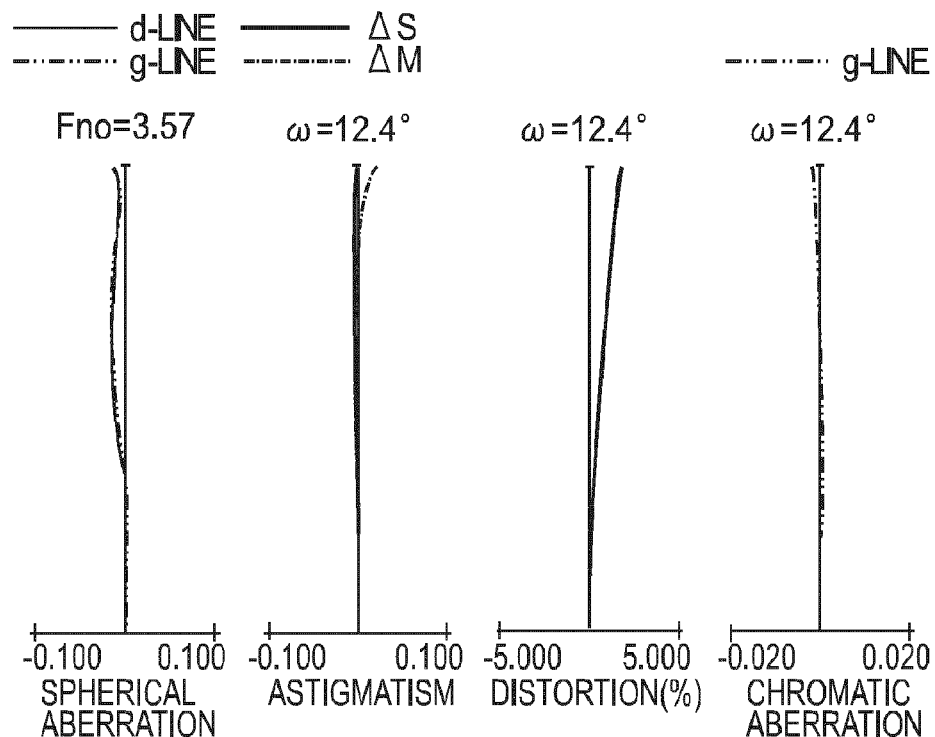
Figure 10C:
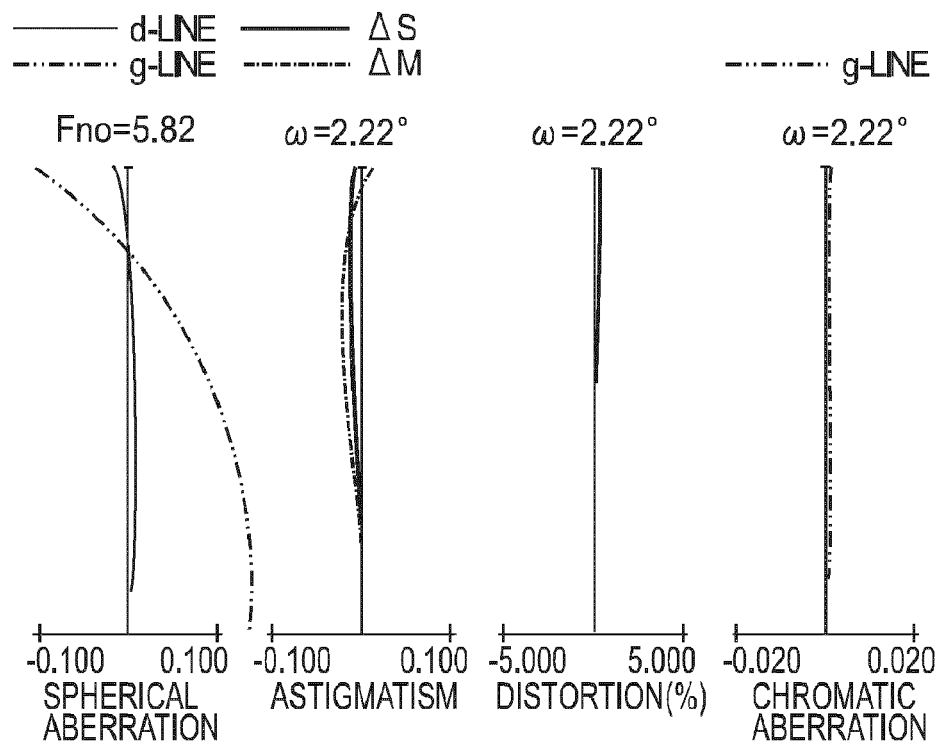

FIG. 9 is a sectional view of a zoom lens at the wide-angle end, according to a fifth embodiment of the present invention. FIG. 10A, FIG. 10B and FIG. 10C are aberration diagrams of the zoom lens of the fifth embodiment at the wide-angle end, the intermediate zooming position and the telephoto end, respectively.

Figures 11, 12A:
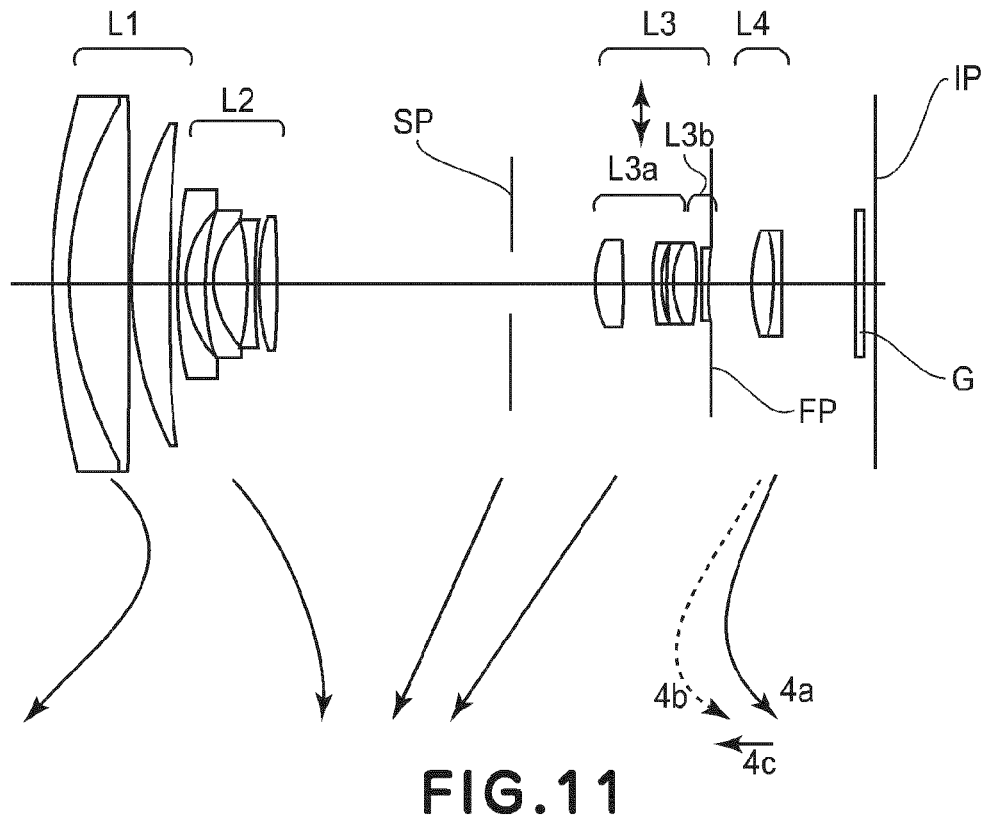
FIG. 11 is a sectional view of a zoom lens at the wide-angle end, according to a sixth embodiment of the present invention.
FIG. 12A through FIG. 12C are aberration diagrams of numerical example 6 corresponding to the sixth embodiment of the present invention.
Figure 12B:
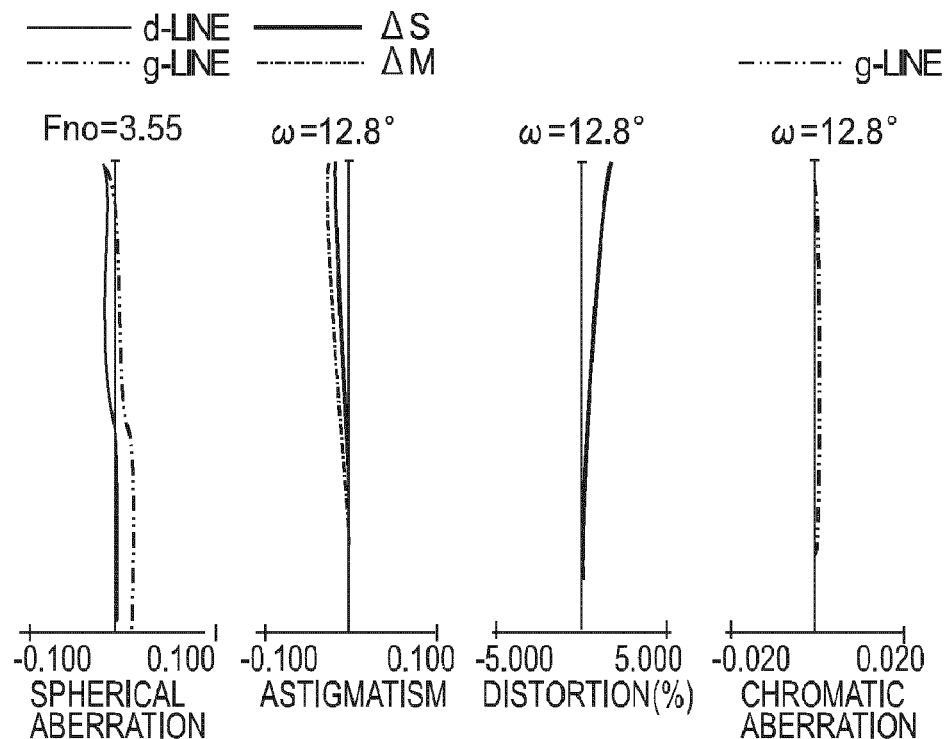
Figure 12C:
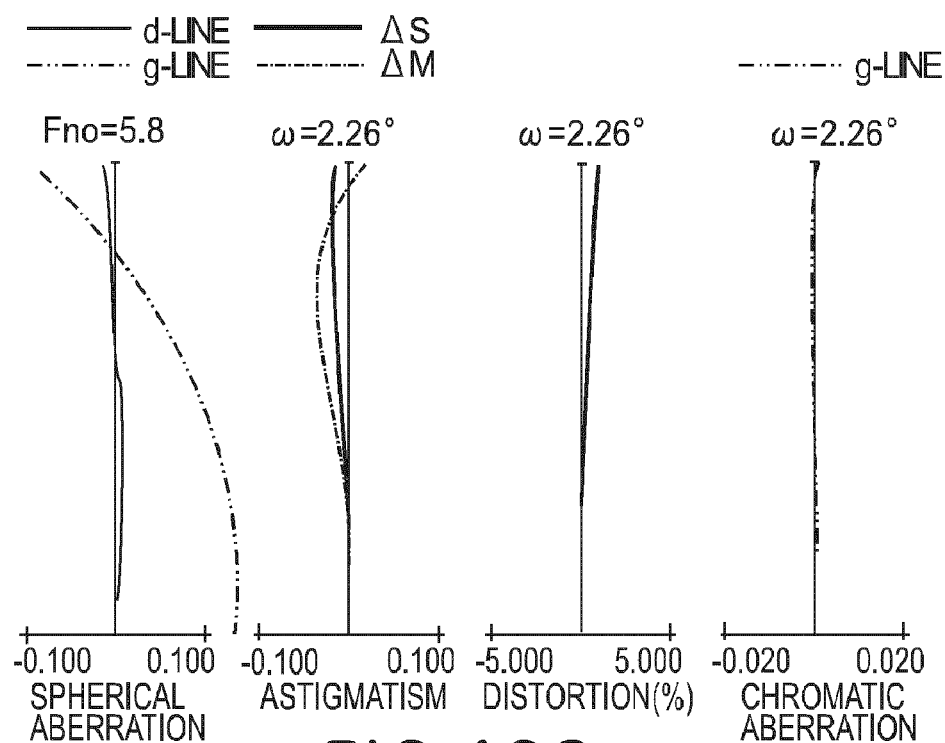

FIG. 11 is a sectional view of a zoom lens at the wide-angle end, according to a sixth embodiment of the present invention. FIG. 12A, FIG. 12B and FIG. 12C are aberration diagrams of the zoom lens of the sixth embodiment at the wide-angle end, the intermediate zooming position and the telephoto end, respectively.

Figure 13:
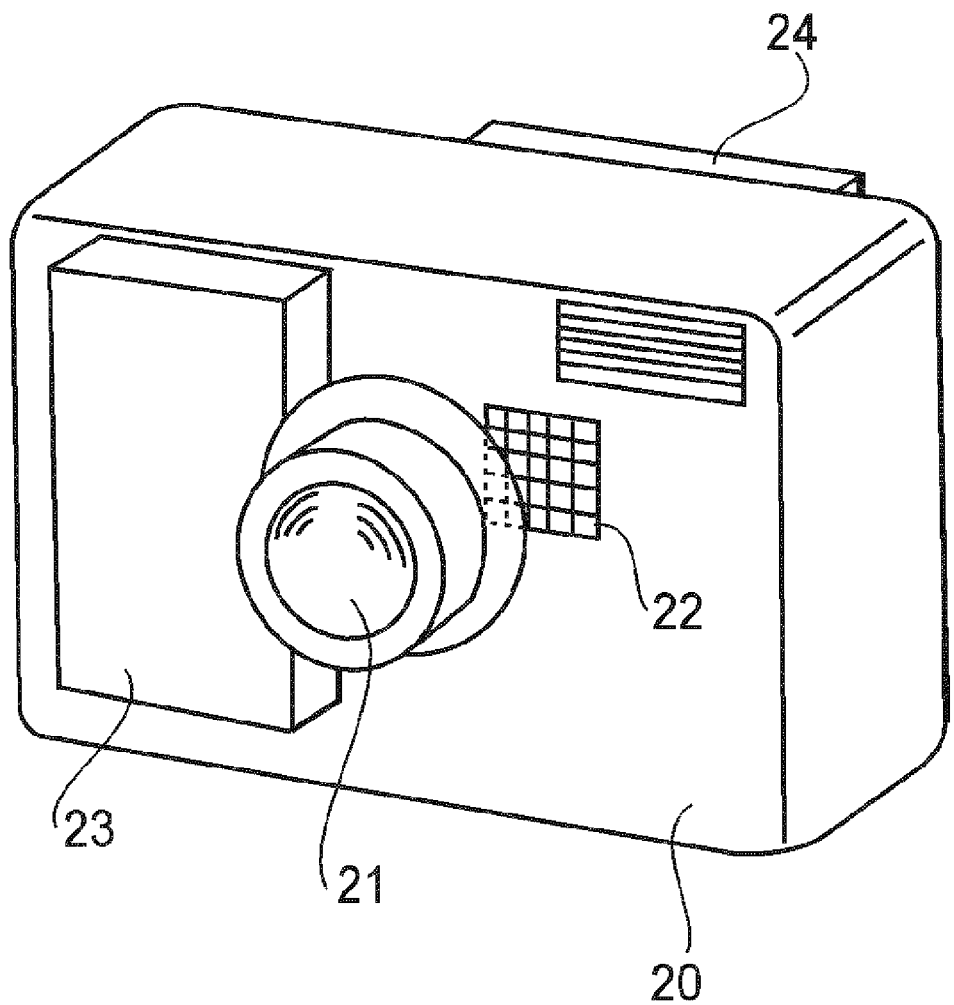
FIG. 13 is a schematic diagram of an image pickup apparatus according to the present invention.

FIG. 13 is a schematic diagram of a main portion of a camera (image pickup apparatus) having a zoom lens according to the present invention.

The zoom lenses of these embodiments are a photographic lens system which can be used in an image pickup apparatus such as a video camera, digital camera or silver film camera. In the lens sectional diagrams, the left-hand side corresponds to the photogenic subject side (object side) (front), and the right-hand side corresponds to the image side (rear). Also, in the lens sectional diagrams, the reference character "i" denotes the order (ordinal) of the lens group counted from the object side, and "Li" denotes the i-th lens group.

In the lens sectional diagrams of FIG. 1, FIG. 3, FIG. 5, FIG. 7 and FIG. 11 according to the first to fourth and sixth embodiments, respectively, L1 denotes a first lens group of positive refracting power (optical power=the reciprocal of the focal length), L2 denotes a second lens group of negative refracting power, L3 denotes a third lens group of positive refracting power, and L4 denotes a fourth lens group of positive refracting power. Thus, the first to fourth and sixth embodiments concern a four-group zoom lens.

In the lens sectional diagram of FIG. 9 corresponding to the fifth embodiment of the present invention, L1 denotes a first lens group of positive refracting power, L2 denotes a second lens group of negative refracting power, L3 denotes a third lens group of positive refracting power, L4 denotes a fourth lens group of positive refracting power, and L5 denotes a fifth lens group of positive refracting power. Thus, the fifth embodiment concerns a five-group zoom lens.

In these embodiments, the third lens group L3 is comprised of, in an order from the object side to the image side, a "$3a$-th" lens group L$3a$ of positive refracting power and a "$3b$-th" lens group L$3b$ of negative refracting power. The "$3b$-th" lens group L$3b$ is comprised of a single negative lens.

Denoted at SP is an aperture stop which is disposed at the object side of the third lens group L3. Denoted in FIG. 1, FIG. 3, FIG. 5, FIG. 7, FIG. 9 and FIG. 11 at FP is a flare stop which is disposed at the image side of the third lens group L3. The flare stop is configured to block unwanted light.

Denoted at G is an optics block which is equivalent to an optical filter, a face plate, a crystal low-pass filter or an infrared cut-off filter, for example.

Denoted at IP is an image plane. When the zoon lens is used as a photography optical system in a video camera or a digital still camera, the image plane is at the image pickup surface of a solid-state image pickup device (photoelectric converting element) such as a CCD sensor or CMOS sensor. When the zoon lens is used in a silver film camera, the photosensitive surface corresponding to the film surface is placed there.

In the aberration diagrams, reference characters d and g denote the d-line and g-line, respectively. Reference characters $\Delta M$ and $\Delta S$ denote the meridional image plane and the sagittal image plane, respectively. The chromatic aberration of magnification is depicted in terms of the g-line. Reference character $\omega$ denotes the half field angle (a half value of the photographic field angle), and fno denotes the F number.

It should be noted that, in the following embodiments, the wide-angle end and the telephoto end refer to the zoom positions when the power changing lens group is located at the opposite ends of the mechanically movable range on the optical axis, respectively.

In the following embodiments, the first to fourth lens groups L1-L4 are moved as depicted by arrows during the zooming from the wide-angle end to the telephoto end.

More specifically, in these embodiments, during the zooming from the wide-angle end to the telephoto end, the first lens group L1 is moved as depicted by an arrow so as to define a locus which is being convexed toward the image side. The second lens group L2 is moved nonlinearly to the image side. The third lens group L3 is moved to an object side. The fourth lens group L4 is moved so as to define a locus which is being convexed toward the object side.

In the fifth embodiment of FIG. 9, the fifth lens group L5 is held stationary during the zooming. It should be noted that, if necessary, the fifth lens group L5 may be moved independently from the other lens groups.

In these embodiments, during the zooming, the first lens group L1 and the third lens group L3 are so moved that, as compared with the wide-angle end, at the telephoto end both of the first and third lens groups are located at the object side. With this arrangement, a large power changing ratio can be provided while assuring a shortened lens overall length at the wide-angle end.

Particularly, in these embodiments, during the zooming the third lens group L3 is moved toward the object side, such that the third lens group L3 shares the power changing function. Furthermore, the first lens group L1 of positive refracting power is moved toward the object side. By doing so, the second lens group L2 can have a large power changing effect. Thus, a large zooming ratio of 18× or more is obtainable without enlarging the refracting power of second lens group L2 too much.

Furthermore, the rear focus type structure in which the fourth lens group L4 is moved along the optical axis to perform the focusing is adopted.

When at the telephoto end the focusing is to be carried out from an infinity object to a short-distance object, the fourth lens group L4 is moved forwardly as shown by an arrow 4c in FIG. 1. A solid line curve 4a and a broken-line curve 4b concerning the fourth lens group L4 depict the movement loci for correcting the image plane change caused by the zooming from the wide-angle end to the telephoto end when the lens is focused on an infinity object and a short distance object, respectively.

Furthermore, the "3a-th" lens group L3a having a positive refracting power is moved to keep a perpendicular component relative to the optical axis so as to shift the image in the direction perpendicular to the optical axis. By this, the blurring of the photographic image when the optical system (zoom lens) as a whole vibrates (tilts) is corrected.

In these embodiments, the vibration control is performed without adding an optical member such as a variable vertex-angle prism or a vibration control lens group. This avoids enlargement in size of the whole optical system.

It should be noted that, although in these embodiments the vibration control is performed by moving the "3a-th" lens group L3a is moved in a direction perpendicular to the optical axis, the moving method is not limited to this. As long as the lens group L3a is moved to keep a perpendicular component relative to the optical axis, it is possible to correct the image blur. For example, if some complexity of the lens barrel structure is allowed, the vibration control may be performed by pivotally moving the "3a-th" lens group L3a so that the pivot center is placed on the optical axis.

Furthermore, in these embodiments, during the zooming the aperture stop SP moves independently of the lens groups. With this arrangement, a steep drop of the light quantity occurring from an intermediate image height to the circumferential portion of the image plane at the wide-angle end and an adjacent zooming position can be improved.

In order to make small the effective lens diameter of the first lens group L1, the number of lenses constituting the first lens group L1 should preferably be small. The first lens group L1 is comprised of three lenses which are, in an order from the object side to the image side, a negative lens, a positive lens and a positive lens.

More specifically, in these embodiments, the first lens group L1 is provided by a cemented lens having a single positive lens and a single negative lens cemented to each other, and a positive lens.

With this structure, spherical aberration and chromatic aberration to be caused by enlarging the zoom ratio is well corrected.

The second lens group L2 comprises four lenses which are a negative lens, a negative lens, a negative lens and a positive lens. More specifically, it is comprised of four independent lenses: a negative lens of meniscus shape having a convex surface at the object side, a negative lens of meniscus shape having a convex shape at the object side, a negative lens of biconcave shape, and a positive lens having a convex shape at the object side.

With this arrangement, the variation of aberration during the zooming is reduced, and distortion at the wide-angle end and spherical aberration at the telephoto end are well corrected.

In these embodiments, the third lens group of positive refracting power L3 is divided into a "3a-th" lens group L3a of positive refracting power and a "3b-th" lens group L3b of negative refracting power. Also, the positive refracting power of the "3a-th" lens group L3a is enlarged to compensate use of the "3b-th" lens group L3b having a negative refracting power. By doing so, the decentration sensitivity of the "3a-th" lens group L3a is magnified, such that a zoom lens with a compact optical system is realized.

The "3a-th" lens group L3a includes at least two pieces of positive lenses and one piece of negative lens.

Specifically, the "3a-th" lens group L3a comprises, in an order from the object side to the image side, a positive lens, a negative lens with a concave surface at the image plane side, and a positive lens. Alternatively, it may comprise a positive lens, a negative lens with a concave surface at the image plane side, and a cemented lens having a negative lens and a positive lens cemented to each other.

With this arrangement, mainly the spherical aberration and comatic aberration at the telephoto end are well corrected. Furthermore, during the vibration control, the quantity of decentration aberration generated is reduced, and good optical performance during the vibration control is maintained.

The "3b-th" lens group L3b is comprised of a single negative lens of meniscus shape. The "3b-th" lens group L3b functions to improve the correction of curvature of field in an intermediate power changing zone (intermediate zooming region) as well as the vibration control sensitivity (which can be defined as the movement amount of the image plane in the perpendicular direction when the vibration control lens group moves by 1 mm in a direction perpendicular to the optical axis) of the "3a-th" lens group L3a. Also, at the same time, it contributes to the improvement of the focus sensitivity (which can be defined as the movement amount of the image plane in the optical axis direction when the focusing lens group moves by 1 mm in the optical axis direction) of the fourth lens group L4. With this arrangement, compactification (reduction in size) of the third lens group L3 as well as simplification of the structure are assured. Furthermore, the focus movement amount of the fourth lens group L4 throughout the whole object distance is shortened, such that reduction in size of the lens barrel is enabled.

The third lens group L3 has one or more aspherical surfaces. This is effective to well correct the aberration change with the zooming.

The fourth lens group L4 is comprised of a single positive lens having a convex surface at the object side or, alternatively, a cemented lens having a positive lens and a negative lens cemented to each other.

In the fifth embodiment of FIG. 9, a fifth lens group L5 of positive refracting power which is held stationary (immovable) relative to the image plane during the zooming, is disposed closest to the image plane side. It contributes to correction of aberrations such as the curvature of field, reduction in size of the front lens diameter and the power change.

The zoom lens according to these embodiments includes at least four lens groups which are, in an order from the object side to the image side, a first lens group L1 of positive refracting power, a second lens group L2 of negative refracting power, a third lens group L3 of positive refracting power, and a fourth lens group L4 of positive refracting power.

During the zooming (power change) from the wide-angle end to the telephoto end, at least the first lens group is moved. Then, the third lens group L3 is constituted by, in an order from the object side to the image side, a "3a-th" lens group of positive refracting power and a "3b-th" lens group of negative refracting power. The "3b-th" lens group is comprised of a single negative lens. The "3a-th" lens group L3a is moved to keep a perpendicular component relative to the optical axis, by which the blurring of the pictorial image as the zoom lens vibrates is corrected.

By changing the power by moving the first lens group L1, the lens overall length at the wide-angle end can be shortened, and the front lens diameter can be reduced as well. Thus, overall compactification is enabled. Furthermore, the vibration control is performed by means of the "3a-th" lens group L3a of the third lens group L3, having a relatively strong positive refracting power. With this arrangement, the movement amount in the perpendicular direction can be made smaller than a case where, as an example, the vibration control is carried out by means of the "3b-th" lens group L3b. Thus, the effective diameter of the lenses constituting the third lens group L3 and the size of the vibration control unit can be made smaller. Furthermore, the weight can be lighted as compared with an example wherein the vibration control is carried out by using the third lens group L3 as a whole. Also, the vibration control sensitivity of the "3a-th" lens group L3a and the focus sensitivity of the fourth lens group L4 are improved based on the "3b-th" lens group L3b of negative refracting power.

With this structure, the shortening of the movement amount of the "3a-th" lens group L3a in the perpendicular direction during the vibration control as well as the shortening of the focusing stroke of the fourth lens group L4 during the focusing are assured.

Furthermore, the "3b-th" lens group L3b is constituted by a single negative lens. By this, the barrel structure of the third lens group L3 is simplified and the thickness of the third lens group L3 in the optical axis direction can be reduced. Thus, reduction in size is enabled. Moreover, the "3b-th" lens group L3b which is a single negative lens performs correction of the field curvature, due to the movement of each lens group, throughout the whole zoom region. If, for example, the "3b-th" lens group L3b is constituted by a cemented lens or the like having a positive lens and a negative lens cemented to each other, it results in that not only the size of the lens group in the thickness direction increases but also correction of the chromatic aberration and correction of the curvature of field are difficult to achieve at the same time. If the chromatic aberration is corrected, the field curvature particularly in the intermediate zooming region turns worse.

When the focal length of the first lens group L1 is denoted by f1 and the focal length of the whole system at the wide-angle end is denoted by fw, conditional expression (1) below is satisfied.

$$10.0<f1/fw<20.0 \tag{1}$$

Conditional expression (1) appropriately defines the ratio between the focal length f1 of the first lens group L1 which contributes to the power changing and the focal length fw of the whole system at the wide-angle end.

If the focal length f1 of the first lens group L1 becomes shorter than the lower limit of conditional expression (1), mainly at the telephoto end the longitudinal chromatic aberration, chromatic aberration of magnification, spherical aberration and so on turn worse. Additionally, it becomes difficult to secure the thickness of the periphery of the positive lens constituting the first lens group L1. Therefore, the lens outside diameter has to be enlarged for the purpose of production. This is not preferable.

If to the contrary the focal length f1 of the first lens group L1 becomes longer than the upper limit of conditional expression (1), the movement amount of the first lens group L1 during the zooming becomes large, and thus the lens overall compactification is difficult to do. Furthermore, with the increase of the movement amount, image joggling during the zooming or vibration sound will be generated. This is not preferable.

More preferably, the numeral range of conditional expression (1) had better be set as follows.

$$10.0<f1/fw<18.0 \tag{1a}$$

With the above-described configuration of these embodiments, the amount of decentration aberration caused when the lens group is decentered so as to correct the blurring of the pictorial image can be made small. Thus, a zoom lens and an image pickup apparatus (optical instrument) having the same by which the vibration control can be well carried out while maintaining high optical performance, are achieved.

Particularly, some lens group constituting the zoom lens is moved to keep the perpendicular component relative to the optical axis. With this arrangement, a zoom lens suitable for a digital camera, a video camera, an electronic still camera or a silversalt photographic camera in which stabilization of the captured image as the zoom lens vibrates (tilts), is accomplished.

In accordance with the embodiments described above, a small-size zoom lens having high zoom ratio and providing good optical performance throughout the whole zooming region, is accomplished.

In the present invention, more preferably, one or more of the following conditions had better be satisfied.

The focal lengths of the first, second, third and fourth lens groups L1, L2, L3 and L4 are denoted by f1, f2, f3 and f4, respectively. The focal lengths of the whole system at the wide-angle end and the telephoto end are denoted by fw and ft, respectively.

The focal lengths of the "3a-th" lens group and the "3b-th" lens group are denoted by f3a and f3b, respectively.

Here, at least one of the following conditional expressions had better be satisfied.

$$0.3<f3a/f4<0.8 \tag{2}$$

$$-0.6<f3a/f3b<-0.1 \tag{3}$$

$$2.5<f1/f3<4.5 \tag{4}$$

$$0.2<f3/f4<1.0 \tag{5}$$

$$18.0<ft/fw<40.0 \tag{6}$$

Next, the technical meaning of these conditional expressions will be explained.

Conditional expression (2) is a condition for appropriately setting the ratio between the focal length f3a of the "3a-th" lens group L3a constituting the third lens group L3 which contributes to the power changing and the focal length f4 of the fourth lens group L4, so as to assure a high zooming ratio while reducing the size of the whole system.

If the focal length f3a of the "3a-th" lens group L3a becomes shorter than the lower limit of conditional expression (2), the power (refracting power) of the fourth lens group L4 becomes weak, and the movement amount of the fourth lens group L4 during the zooming and focusing becomes large. Thus, the lens overall length increases, and it is not preferable. Furthermore, since the refracting power of the "3a-th" lens group L3a becomes large, mainly correction of spherical aberration and comatic aberration becomes difficult to do. Also, since the decentration sensitivity of the "3a-th" lens group L3a becomes higher, correction of aberrations such as comatic aberration or curvature of field during the vibration control becomes difficult to achieve. Further, the required central positioning accuracy of the "3a-th" lens group L3a during the vibration control becomes very strict, causing a difficulty in the production.

If to the contrary the focal length f3a of the "3a-th" lens group L3a becomes longer than the upper limit of conditional expression (2), the sharing proportion of power changing of the "3a-th" lens group L3a becomes small, and thus increasing the zooming ratio is difficult to achieve. Furthermore, the movement amount in the direction perpendicular to the optical axis during the vibration control becomes large, which causes an increase of the lens diameter of the third lens group L3. This is not preferable.

Conditional expression (3) is a condition for appropriately setting the ratio between the focal length f3a of the "3a-th" lens group L3a and the focal length f3b of the "3b-th" lens group L3b so as to achieve compactification of the third lens group L3 as a whole.

If the focal length f3a of the "3a-th" lens group L3a becomes shorter than the lower limit of conditional expression (3), mainly the correction of spherical aberration or comatic aberration becomes difficult to achieve. Furthermore, since the decentration sensitivity of the "3a-th" lens group L3a becomes higher, the optical performance during the vibration control turns worse. Moreover, the required central positioning accuracy of the "3a-th" lens group L3a during the vibration control becomes very strict, causing a difficulty in the production.

If to the contrary the focal length f3b of the "3b-th" lens group L3b becomes longer than the upper limit of conditional expression (3), it becomes difficult to improve the vibration control sensitivity of the "3a-th" lens group L3a. Furthermore, throughout the whole zooming region, mainly the correction of curvature of field and comatic aberration becomes difficult to attain.

Conditional expression (4) is a condition for appropriately setting the ratio between the focal length f1 of the first lens group L1, contributable to the power changing, and the focal length f3 of the third lens group L3 so as to achieve a high zooming ration while keeping the whole system compact.

If the focal length f1 of the first lens group L1 becomes shorter than the lower limit of conditional expression (4), mainly the longitudinal chromatic aberration at the telephoto end as well as the chromatic aberration of magnification and spherical aberration turn worse. Furthermore, it becomes difficult to secure the thickness of the periphery of the positive lens constituting the first lens group L1. As a result, the lens outside diameter has to be made large, and this is not preferable.

Furthermore, if the focal length f3 of third lens group L3 becomes long, mainly the correction of spherical aberration and comatic aberration becomes difficult to achieve.

If to the contrary the focal length f1 of the first lens group L1 becomes longer than the upper limit of conditional expression (4), the movement amount of the first lens group L1 during the zooming becomes large, causing a difficulty in compactification of the lens whole system. Furthermore, with the increase of the movement amount, image joggling during the zooming or vibration sound is generated. This is not preferable. On the other hand, if the focal length f3 of the third lens group L3 becomes short, the incidence angle of the light beam entering the fourth lens group L4 becomes large. As a result, the optical performance changes largely when the focusing is carried out by the fourth lens group L4. Furthermore, the sensitivity to decentration of the third lens group L3 becomes large, causing a difficulty in the production or assembly.

Conditional expression (5) is a condition for appropriately setting the ratio between the focal length f3 of the third lens group L3 and the focal length f4 of the fourth lens group L1 so as to achieve a high zooming ration while keeping the whole system compact.

If the focal length f3 of the third lens group L3 becomes shorter than the lower limit of conditional expression (5), the refracting power of the fourth lens group L4 becomes relatively weak, and the stroke of the fourth lens group L4 with the focusing becomes large particularly at the telephoto end. Thus, the lens overall length increases, and it is not preferable.

Furthermore, since the refracting power of the third lens group L3 becomes large, mainly the correction of spherical aberration and comatic aberration becomes difficult.

If on the other hand the focal length f3 of the third lens group L3 becomes short, mainly the change of the incidence angle of the light beam entering the fourth lens group L4 when the same is focused at the telephoto end becomes large. It results in a large change of the optical performance due to the change in the object distance, and this is not preferable.

If to the contrary the focal length f3 of the third lens group L3 becomes longer than the upper limit of conditional expression (5), the sharing proportion of the power change of the third lens group L3 becomes small, and thus increasing the zooming ratio becomes difficult. Also, mainly the correction of spherical aberration and comatic aberration becomes difficult to achieve. Furthermore, if the focal length f4 of the fourth lens group L4 becomes short, the light beam incident on the imaging plane changes largely with the zooming, causing color shading. This is not preferable.

Conditional expression (6) is a condition concerning the zooming ratio and for assuring effective vibration control when the third lens group L3 is divided into a positive "3a-th" lens group L3a and a negative "3b-th" lens group L3b and the vibration control is performed based on the positive "3a-th" lens group L3a.

If the focal length ft goes beyond the lower limit of conditional expression (6) and becomes smaller than the focal length fw (i.e., if the zoom ratio becomes too small), during the vibration control the movement amount of the "3a-th" lens group L3a in the perpendicular direction becomes small. As a result, the difference with the effect of vibration control when the same is done based on the third lens group L3 as a whole becomes small. This is not preferable.

If to the contrary the focal length ft goes beyond the upper limit of conditional expression (6) and becomes larger than the focal length fw (i.e., if the zoom ratio becomes too large), during the vibration control the movement amount of the "3a-th" lens group L3a in the perpendicular direction becomes large. This causes quite large deterioration of the optical performance during the vibration control, and this is not preferable.

It should be noted that, in each of these embodiments, for better aberration correction and for further reduction in size of the lens whole system while suppressing the aberration change during the zooming, the numerical ranges of conditional expressions (1) to (6) had better be set as follows.

$$0.35 < f3a/f4 < 0.70 \quad (2a)$$

$$-0.55 < f3a/f3b < -0.15 \quad (3a)$$

$$2.7 < f1/f3 < 4.2 \quad (4a)$$

$$0.30 < f3/f4 < 0.85 \quad (5a)$$

$$18.5 < ft/fw < 35.0 \quad (6a)$$

In accordance with these embodiments as described hereinbefore, in order to correct the blurring of the pictorial image, the third lens group L3 is suitably divided into two lens groups and the power distribution of these lens groups is set appropriately. With this arrangement, a zoom lens in which the amount of decentration aberration to be caused by the decentration is well suppressed and high optical performance is accomplished is provided. Particularly, with the present invention, good optical performance during the vibration control at the telephoto end can be maintained.

Next, numerical examples 1-6 corresponding to the first to sixth embodiments of the present invention will be explained. In these numerical examples, the reference character "I" denotes the order (ordinal) of the optical surface counted from the object side. Also, "ri" denotes the curvature radius of the i-th optical surface (i-th surface), and "di" denotes the spacing between the i-th surface and (i+1)th surface. Furthermore, "ndi" and "vdi" denote the refractive index of material of the i-th optical member with respect to the d-line and the Abbe's number, respectively.

Furthermore, "k" denotes the eccentricity, and "A4", "A6", "A8" and "A10" denote aspherical coefficients, respectively. When the displacement in the optical axis direction at a position of the height h from the optical axis is denoted by x while taking the plane vertex as a reference, the aspherical shape can be represented by the following equation.

$$x = (h^2/R)/[1+[1-(1+k)(h/R)^2]^{1/2}] + A4h^4 + A6h^6 + A8h^8 + A10h^{10}$$

where R is the paraxial curvature radius. Also, the expression of "E-Z" means "10-Z".

In the numerical examples, the last two surfaces are the surfaces of an optics block such as a filter, a face plate and the like.

In each of these embodiments, the back focus (BF) represents the distance from the lens final surface to the paraxial image plane, in terms of the air converted length. The lens overall length corresponds to the distance from the plane closes to the object side to final surface plus the back focus. Also, "d28" of numerical examples 1-4 and "d28" of numerical examples 5 and 6 are the distance up to the image plane.

Also, Table 1 shows the correspondence with the conditional expressions in each numerical example.

NUMERICAL EXAMPLE 1

| Surface Data | | | | |
|---|---|---|---|---|
| Surface No. | r | d | nd | vd |
| 1 | 76.150 | 1.80 | 1.80610 | 33.3 |
| 2 | 37.320 | 6.30 | 1.49700 | 81.5 |
| 3 | −839.796 | 0.20 | | |
| 4 | 36.109 | 4.25 | 1.60311 | 60.6 |
| 5 | 156.842 | (variable) | | |
| 6 | 54.202 | 1.00 | 1.88300 | 40.8 |
| 7 | 11.015 | 2.10 | | |
| 8 | 28.090 | 0.80 | 1.88300 | 40.8 |
| 9 | 9.248 | 3.60 | | |
| 10 | −27.934 | 0.70 | 1.80610 | 33.3 |
| 11 | 64.007 | 0.20 | | |
| 12 | 20.074 | 2.40 | 1.92286 | 18.9 |
| 13 | −96.663 | (variable) | | |
| 14 (stop) | infinite | (variable) | | |
| 15* | 10.150 | 3.20 | 1.58313 | 59.4 |
| 16 | −62.532 | 2.82 | | |
| 17 | 30.340 | 0.80 | 1.80610 | 33.3 |
| 18 | 10.076 | 0.50 | | |
| 19 | 18.258 | 0.70 | 2.00069 | 25.5 |
| 20 | 8.638 | 2.70 | 1.71999 | 50.2 |
| 21 | −35.972 | 0.50 | | |
| 22 | 86.235 | 0.70 | 1.58313 | 59.4 |
| 23 | 30.000 | 0.30 | | |
| 24 (FP) | infinite | (variable) | | |
| 25* | 20.173 | 2.00 | 1.58313 | 59.4 |
| 26 | 388.237 | (variable) | | |
| 27 | infinite | 1.00 | 1.51633 | 64.1 |
| 28 | infinite | | | |

Aspherical Surface Data

15t Surface

K = −5.09950e−001, A4 = −6.19890e−005, A6 = 4.89106e−007,
A8 = −6.83395e−008, A10 = 2.12024e−009

25th Surface

K = −2.71019e+000, A4 = 3.64245e−005, A6 = 3.16922e−007,
A8 = −6.60093e−009

| Various Data Zoom Ratio: 19.08 | | | |
|---|---|---|---|
| | Wide | Intermediate | Telephoto |
| Focal Length | 5.13 | 17.56 | 97.76 |
| F number | 2.87 | 3.59 | 5.84 |
| Field Angle | 37.09 | 12.45 | 2.27 |
| Image Height | 3.88 | 3.88 | 3.88 |
| Total Lens Length | 87.05 | 92.42 | 119.09 |
| BF | 10.07 | 17.02 | 9.34 |
| d5 | 0.70 | 21.82 | 41.22 |
| d13 | 26.46 | 8.88 | 2.04 |
| d14 | 7.79 | 3.75 | 1.10 |
| d24 | 4.46 | 3.39 | 27.82 |
| d26 | 8.41 | 15.36 | 7.68 |
| d28 | 1.00 | 1.00 | 1.00 |

| Zoom Lens Group Data | | |
|---|---|---|
| Group | Initial Surface | Focal Length |
| 1 | 1 | 63.49 |
| 2 | 6 | −9.38 |
| 3 | 15 | 19.45 |
| 4 | 25 | 36.42 |

NUMERICAL EXAMPLE 2

Surface Data

| Surface No. | r | d | nd | vd |
|---|---|---|---|---|
| 1 | 86.433 | 1.80 | 1.80610 | 33.3 |
| 2 | 41.692 | 6.25 | 1.49700 | 81.5 |
| 3 | −480.535 | 0.20 | | |
| 4 | 37.627 | 4.10 | 1.60311 | 60.6 |
| 5 | 126.596 | (variable) | | |
| 6 | 43.256 | 1.00 | 1.88300 | 40.8 |
| 7 | 10.771 | 2.10 | | |
| 8 | 31.081 | 0.80 | 1.88300 | 40.8 |
| 9 | 9.486 | 3.60 | | |
| 10 | −28.214 | 0.70 | 1.80610 | 33.3 |
| 11 | 107.446 | 0.20 | | |
| 12 | 20.755 | 2.40 | 1.92286 | 18.9 |
| 13 | −121.587 | (variable) | | |
| 14 (stop) | infinite | (variable) | | |
| 15* | 9.768 | 3.20 | 1.58313 | 59.4 |
| 16 | −53.234 | 2.73 | | |
| 17 | 36.132 | 0.70 | 1.80610 | 33.3 |
| 18 | 9.566 | 0.50 | | |
| 19 | 17.292 | 0.70 | 2.00069 | 25.5 |
| 20 | 8.781 | 2.70 | 1.71999 | 50.2 |
| 21 | −31.232 | 0.40 | | |
| 22 | −203.125 | 0.70 | 1.69680 | 55.5 |
| 23 | 61.553 | 0.30 | | |
| 24 (FP) | infinite | (variable) | | |
| 25 | 20.699 | 1.80 | 1.58313 | 59.4 |
| 26 | 187.324 | (variable) | | |
| 27 | infinite | 1.00 | 1.51633 | 64.1 |
| 28 | infinite | | | |

Aspherical Surface Data
15th Surface

K = −4.50746e−001, A4 = −7.56392e−005, A6 = 6.03037e−007, A8 = −7.75261e−008, A10 = 2.12024e−009

Various Data
Zoom Ratio: 19.07

| | Wide | Intermediate | Telephoto |
|---|---|---|---|
| Focal Length | 5.12 | 14.48 | 97.73 |
| F number | 2.83 | 3.52 | 5.87 |
| Field Angle | 37.09 | 14.98 | 2.27 |
| Image Height | 3.88 | 3.88 | 3.88 |
| Total Lens Length | 87.50 | 93.61 | 124.13 |
| BF | 10.07 | 15.26 | 10.24 |
| d5 | 0.70 | 20.73 | 45.71 |
| d13 | 27.52 | 12.08 | 1.96 |
| d14 | 7.85 | 3.81 | 1.10 |
| d24 | 4.48 | 4.85 | 28.23 |
| d26 | 8.41 | 13.60 | 8.58 |
| d28 | 1.00 | 1.00 | 1.00 |

Zoom Lens Group Data

| Group | Initial Surface | Focal Length |
|---|---|---|
| 1 | 1 | 70.00 |
| 2 | 6 | −9.80 |
| 3 | 15 | 19.27 |
| 4 | 25 | 39.75 |

NUMERICAL EXAMPLE 3

Surface Data

| Surface No. | r | d | nd | vd |
|---|---|---|---|---|
| 1 | 67.094 | 1.80 | 1.80610 | 33.3 |
| 2 | 31.683 | 6.25 | 1.49700 | 81.5 |
| 3 | −370.584 | 0.20 | | |
| 4 | 29.958 | 4.10 | 1.60311 | 60.6 |
| 5 | 132.718 | (variable) | | |
| 6 | 74.017 | 1.00 | 1.88300 | 40.8 |
| 7 | 11.680 | 2.10 | | |
| 8 | 28.702 | 0.80 | 1.88300 | 40.8 |
| 9 | 8.086 | 3.60 | | |
| 10 | −22.265 | 0.70 | 1.80610 | 33.3 |
| 11 | 65.869 | 0.20 | | |
| 12 | 19.756 | 2.40 | 1.92286 | 18.9 |
| 13 | −66.184 | (variable) | | |
| 14 (stop) | infinite | (variable) | | |
| 15* | 8.855 | 3.20 | 1.58313 | 59.4 |
| 16 | −21.744 | 2.74 | | |
| 17 | 71.030 | 0.70 | 1.80610 | 33.3 |
| 18 | 8.465 | 0.50 | | |
| 19 | 14.132 | 0.70 | 2.00069 | 25.5 |
| 20 | 7.007 | 2.70 | 1.71999 | 50.2 |
| 21 | −29.089 | 0.40 | | |
| 22 | −68.175 | 0.70 | 1.69680 | 55.5 |
| 23 | 34.073 | 0.30 | | |
| 24 (FP) | infinite | (variable) | | |
| 25 | 15.607 | 1.80 | 1.58313 | 59.4 |
| 26 | −1661.846 | (variable) | | |
| 27 | infinite | 1.00 | 1.51633 | 64.1 |
| 28 | infinite | | | |

Aspherical Surface Data
15th Surface

K = −7.52773e−001, A4 = −1.16164e−004, A6 = 4.08440e−007, A8 = −8.49947e−008, A10 = 2.12024e−009

Various Data
Zoom Ratio: 19.03

| | Wide | Intermediate | Telephoto |
|---|---|---|---|
| Focal Length | 5.12 | 16.26 | 97.51 |
| F number | 2.87 | 3.57 | 5.88 |
| Field Angle | 37.09 | 13.40 | 2.28 |
| Image Height | 3.88 | 3.88 | 3.88 |
| Total Lens Length | 78.71 | 83.00 | 103.94 |
| BF | 8.14 | 14.45 | 6.72 |
| d5 | 0.70 | 17.17 | 33.58 |
| d13 | 20.75 | 7.38 | 1.99 |
| d14 | 7.85 | 3.95 | 1.09 |
| d24 | 4.38 | 3.15 | 23.66 |
| d26 | 6.48 | 12.79 | 5.06 |
| d28 | 1.00 | 1.00 | 1.00 |

Zoom Lens Group Data

| Group | Initial Surface | Focal Length |
|---|---|---|
| 1 | 1 | 52.10 |
| 2 | 6 | −8.15 |
| 3 | 15 | 17.32 |
| 4 | 25 | 26.53 |

NUMERICAL EXAMPLE 4

Surface Data

| Surface No. | r | d | nd | vd |
|---|---|---|---|---|
| 1 | 67.094 | 1.80 | 1.80610 | 33.3 |
| 2 | 31.683 | 6.25 | 1.49700 | 81.5 |
| 1 | 76.853 | 1.80 | 1.80610 | 33.3 |
| 2 | 37.763 | 6.25 | 1.49700 | 81.5 |
| 3 | −701.616 | 0.20 | | |
| 4 | 36.812 | 4.10 | 1.60311 | 60.6 |
| 5 | 146.181 | (variable) | | |
| 6 | 30.428 | 1.00 | 1.88300 | 40.8 |
| 7 | 11.277 | 2.10 | | |
| 8 | 48.826 | 0.80 | 1.88300 | 40.8 |
| 9* | 8.394 | 3.60 | | |
| 10 | −22.994 | 0.70 | 1.80610 | 33.3 |
| 11 | 316.236 | 0.20 | | |
| 12 | 20.671 | 2.40 | 1.92286 | 18.9 |
| 13 | −91.802 | (variable) | | |
| 14 (stop) | infinite | (variable) | | |
| 15* | 8.949 | 3.20 | 1.58313 | 59.4 |
| 16 | −28.863 | 2.70 | | |
| 17 | 80.993 | 0.70 | 1.80610 | 33.3 |
| 18 | 8.343 | 0.50 | | |
| 19 | 13.373 | 0.70 | 2.00069 | 25.5 |
| 20 | 7.527 | 2.70 | 1.71999 | 50.2 |
| 21 | −30.782 | 0.40 | | |
| 22 | −61.127 | 0.70 | 1.69680 | 55.5 |
| 23 | 40.314 | 0.30 | | |
| 24 (FP) | infinite | (variable) | | |
| 25 | 16.450 | 1.80 | 1.58313 | 59.4 |
| 26 | −242.919 | (variable) | | |
| 27 | infinite | 1.00 | 1.51633 | 64.1 |
| 28 | infinite | | | |

Aspherical Surface Data

9th Surface

K = −8.30991e−002, A4 = 1.64759e−005, A6 = 1.88717e−007, A8 = 1.53904e−009

15th Surface

K = −2.82137e−001, A4 = −1.46812e−004, A6 = 3.66270e−007, A8 = −9.25941e−008, A10 = 2.12024e−009

Various Data
Zoom Ratio: 23.34

| | Wide | Intermediate | Telephoto |
|---|---|---|---|
| Focal Length | 5.12 | 12.18 | 119.63 |
| F number | 2.75 | 3.41 | 5.87 |
| Field Angle | 37.09 | 17.65 | 1.86 |
| Image Height | 3.88 | 3.88 | 3.88 |
| Total Lens Length | 83.85 | 89.80 | 119.45 |
| BF | 9.24 | 12.71 | 6.10 |
| d5 | 0.70 | 15.45 | 44.85 |
| d13 | 24.81 | 12.59 | 2.88 |
| d14 | 7.85 | 4.64 | 1.18 |
| d24 | 4.39 | 7.56 | 27.58 |
| d26 | 7.58 | 11.05 | 4.44 |
| d28 | 1.00 | 1.00 | 1.00 |

Zoom Lens Group Data

| Group | Initial Surface | Focal Length |
|---|---|---|
| 1 | 1 | 65.42 |
| 2 | 6 | −9.23 |
| 3 | 15 | 19.20 |
| 4 | 25 | 26.49 |

NUMERICAL EXAMPLE 5

Surface Data

| Surface No. | r | d | nd | vd |
|---|---|---|---|---|
| 1 | 67.094 | 1.80 | 1.80610 | 33.3 |
| 2 | 31.683 | 6.25 | 1.49700 | 81.5 |
| 1 | 76.193 | 1.80 | 1.80610 | 33.3 |
| 2 | 37.010 | 6.30 | 1.49700 | 81.5 |
| 3 | −702.777 | 0.20 | | |
| 4 | 35.961 | 4.25 | 1.60311 | 60.6 |
| 5 | 156.906 | (variable) | | |
| 6 | 50.721 | 1.00 | 1.88300 | 40.8 |
| 7 | 10.920 | 2.10 | | |
| 8 | 35.606 | 0.80 | 1.88300 | 40.8 |
| 9 | 9.387 | 3.60 | | |
| 10 | −36.860 | 0.70 | 1.80610 | 33.3 |
| 11 | 52.442 | 0.20 | | |
| 12 | 18.975 | 2.40 | 1.92286 | 18.9 |
| 13 | −151.791 | (variable) | | |
| 14 (stop) | infinity | (variable) | | |
| 15* | 11.623 | 3.20 | 1.58313 | 59.4 |
| 16 | −83.577 | 4.30 | | |
| 17 | 25.898 | 0.80 | 1.92286 | 18.9 |
| 18 | 10.684 | 0.50 | | |
| 19 | 26.374 | 2.00 | 1.77250 | 49.6 |
| 20 | −33.636 | 0.40 | | |
| 21 | 131.126 | 0.70 | 1.60311 | 60.6 |
| 22 | 33.819 | 0.30 | | |
| 23 (FP) | infinity | (variable) | | |
| 24* | 20.173 | 2.00 | 1.58313 | 59.4 |
| 25 | 143.976 | (variable) | | |
| 26 | −44.207 | 1.80 | 1.51633 | 64.1 |
| 27 | −25.803 | 1.51 | | |
| 28 | infinity | 1.00 | 1.51633 | 64.1 |
| 29 | infinity | | | |

Aspherical Surface Data

15th Surface

K = 4.94320e−002, A4 = −9.60062e−005, A6 = 2.70978e−007, A8 = −6.86180e−008, A10 = 2.12024e−009

24th Surface

K = −1.85504e+000, A4 = 2.44173e−005, A6 = 3.02251e−007, A8 = −3.36277e−009

Various Data
Zoom Ratio: 19.50

| | Wide | Intermediate | Telephoto |
|---|---|---|---|
| Focal Length | 5.13 | 17.55 | 99.93 |
| F number | 2.87 | 3.57 | 5.82 |
| Field Angle | 37.09 | 12.45 | 2.22 |
| Image Height | 3.88 | 3.88 | 3.88 |
| Total Lens Length | 88.36 | 93.74 | 120.40 |
| BF | 3.17 | 3.17 | 3.17 |
| d5 | 0.70 | 21.82 | 41.22 |
| d13 | 26.37 | 8.79 | 1.95 |
| d14 | 7.79 | 3.75 | 1.10 |
| d23 | 4.48 | 3.06 | 29.25 |
| d25 | 6.50 | 13.81 | 4.37 |
| d29 | 1.00 | 1.00 | 1.00 |

Zoom Lens Group Data

| Group | Initial Surface | Focal Length |
|---|---|---|
| 1 | 1 | 63.04 |
| 2 | 6 | −9.33 |
| 3 | 15 | 19.96 |
| 4 | 24 | 39.99 |
| 5 | 26 | 116.17 |

NUMERICAL EXAMPLE 6

Surface Data

| Surface No. | r | d | nd | vd |
|---|---|---|---|---|
| 1 | 67.094 | 1.80 | 1.80610 | 33.3 |
| 2 | 31.683 | 6.25 | 1.49700 | 81.5 |
| 1 | 72.147 | 1.80 | 1.80610 | 33.3 |
| 2 | 35.110 | 6.30 | 1.49700 | 81.5 |
| 3 | −1895.867 | 0.20 | | |
| 4 | 35.096 | 4.20 | 1.60311 | 60.6 |
| 5 | 174.495 | (variable) | | |
| 6 | 52.397 | 1.00 | 1.88300 | 40.8 |
| 7 | 11.150 | 2.10 | | |
| 8 | 30.450 | 0.80 | 1.88300 | 40.8 |
| 9 | 9.110 | 3.60 | | |
| 10 | −26.688 | 0.70 | 1.80610 | 33.3 |
| 11 | 79.207 | 0.20 | | |
| 12 | 20.565 | 2.30 | 1.92286 | 18.9 |
| 13 | −94.030 | (variable) | | |
| 14 (stop) | infinite | (variable) | | |
| 15* | 10.132 | 3.20 | 1.58313 | 59.4 |
| 16* | −57.516 | 3.01 | | |
| 17 | 26.728 | 0.80 | 1.80610 | 33.3 |
| 18 | 10.549 | 0.50 | | |
| 19 | 19.583 | 0.70 | 2.00330 | 28.3 |
| 20 | 7.632 | 2.70 | 1.71999 | 50.2 |
| 21 | −36.695 | 0.50 | | |
| 22 | −271.272 | 0.70 | 1.58313 | 59.4 |
| 23 | 56.380 | 0.30 | | |
| 24 (FP) | infinite | (variable) | | |
| 25* | 20.173 | 2.40 | 1.77250 | 49.6 |
| 26 | −23.872 | 0.60 | 1.83400 | 37.2 |
| 27 | 124.132 | (variable) | | |
| 28 | infinite | 1.00 | 1.51633 | 64.1 |
| 29 | infinite | | | |

Aspherical Surface Data

15th Surface

K = −6.04956e−001, A4 = −6.13122e−005, A6 = 7.43105e−007,
A8 = −6.93878e−008, A10 = 2.12024e−009

16th Surface

K = −1.57825e+000, A4 = −1.17070e−005, A6 = 2.31644e−007,
A8 = −9.19245e−010

25th Surface

K = 5.70981e−002, A4 = −2.84712e−006, A6 = 3.28630e−007,
A8 = −6.43908e−009

Various Data
Zoom Ratio: 19.13

| | Wide | Intermediate | Telephoto |
|---|---|---|---|
| Focal Length | 5.12 | 17.06 | 97.98 |
| F number | 2.87 | 3.55 | 5.80 |
| Field Angle | 37.12 | 12.80 | 2.26 |
| Image Height | 3.88 | 3.88 | 3.88 |
| Total Lens Length | 85.51 | 90.53 | 116.56 |
| BF | 9.27 | 15.83 | 7.59 |
| d5 | 0.70 | 20.61 | 39.90 |
| d13 | 24.03 | 7.55 | 1.13 |
| d14 | 8.72 | 4.68 | 2.03 |
| d24 | 4.18 | 3.24 | 27.30 |
| d27 | 7.61 | 14.18 | 5.93 |
| d29 | 1.00 | 1.00 | 1.00 |

Zoom Lens Group Data

| Group | Initial Surface | Focal Length |
|---|---|---|
| 1 | 1 | 61.25 |
| 2 | 6 | −9.21 |
| 3 | 15 | 19.25 |
| 4 | 25 | 33.83 |

TABLE 1

| Conditional Expression | Example 1 | Example 2 | Example 3 | Example 4 | Example 5 | Example 6 |
|---|---|---|---|---|---|---|
| (1) 10.0 < f1/fw < 20.0 | 12.387 | 13.659 | 10.166 | 12.766 | 12.299 | 11.962 |
| (2) 0.3 < f3a/f4 < 0.8 | 0.478 | 0.424 | 0.539 | 0.582 | 0.441 | 0.510 |
| (3) −0.6 < f3a/f3b < −0.1 | −0.219 | −0.249 | −0.440 | −0.444 | −0.233 | −0.216 |
| (4) 2.5 < f1/f3 < 4.5 | 3.265 | 3.632 | 3.007 | 3.407 | 3.158 | 3.182 |
| (5) 0.2 < f3/f4 < 1.0 | 0.534 | 0.485 | 0.653 | 0.725 | 0.499 | 0.569 |
| (6) 18.0 < ft/fw < 40.0 | 19.076 | 19.070 | 19.027 | 23.342 | 19.499 | 19.134 |

Next, an embodiment of a digital still camera which uses a zoom lens according to anyone of the aforementioned embodiments as a photographic optical system, will be explained with reference to FIG. 13.

In FIG. 13, denoted at 20 is a camera body, and denoted at 21 is a photographic optical system which is comprised of a zoom lens according to any one of the first to fifth embodiments described hereinbefore. Denoted at 22 is a solid-state image pickup device such as a CCD sensor or a CMOS sensor (photoelectric converting element) which is provided inside the camera body and which receives a photogenic subject image formed by the photographic optical system 21. Denoted at 23 is a memory for recording the information corresponding to the photogenic subject image as photoelectrically converted by the solid-state image pickup device 22. Denoted at 24 is a finder which is comprised of a liquid crystal display panel, for example, to observe the photogenic subject image formed on the solid-state image pickup device 22.

By applying a zoom lens of the present invention to an image pickup apparatus such as a digital still camera, as described above, an image pickup apparatus being compact in size and having high optical performance is accomplished.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2008-136616 filed May 26, 2008, for which is hereby incorporated by reference.

What is claimed is:

1. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved in a direction having a perpendicular component relative to an optical axis to correct image blur to be produced when said zoom lens vibrates, and
wherein, when a focal length of said first lens group is denoted by f1 and a the focal length of the whole system at the wide-angle end is denoted by fw, a conditional expression $10.0 < f1/fw < 20.0$ is satisfied, wherein, when a focal length of said first lens sub-group of said third lens group is denoted by f3a and a focal length of said fourth lens group is denoted by f4, a conditional expression $0.3 < f3a/f4 < 0.8$ is satisfied.

2. A zoom lens as claimed in claim 1, wherein, when a focal length of said first lens sub-group of said third lens group is denoted by f3a and a focal length of said second lens sub-group of said third lens group is denoted by f3b, a conditional expression $-0.6 < f3a/f3b < -0.1$ is satisfied.

3. A zoom lens as claimed in claim 1, wherein, when focal lengths of said first and third lens groups are denoted by f1 and f3, a conditional expression $2.5 < f1/f3 < 4.5$ is satisfied.

4. A zoom lens as claimed in claim 1, wherein, when focal lengths of said third and fourth lens groups are denoted by f3 and f4, a conditional expression $0.2 < f3/f4 < 1.0$ is satisfied.

5. A zoom lens as claimed in claim 1, wherein, when the focal length of the whole system at the wide-angle end and the telephoto end is denoted by fw and ft, respectively, a conditional expression $18.0 < ft/fw < 40.0$ is satisfied.

6. A zoom lens as claimed in claim 1, wherein said first lens sub-group of said third lens group includes at least two pieces of positive lenses and one piece of negative lens.

7. A zoom lens as claimed in claim 1, wherein said first lens group is comprised of three lenses which are, in an order from the object side to the image side, a negative lens, a positive lens and a positive lens.

8. A zoom lens as claimed in claim 1, wherein said second lens group is comprised of four lenses which are, in an order from the object side to the image side, a negative lens, a negative lens, a negative lens and a positive lens.

9. A zoom lens as claimed in claim 1, wherein said second lens sub-group of said third lens group is comprised of a single negative lens having a meniscus shape.

10. A zoom lens as claimed in claim 1, wherein said fourth lens group is comprised of one piece of positive lens or a cemented lens having a positive lens and a negative lens cemented to each other.

11. A zoom lens as claimed in claim 1, further comprising a fifth lens group of positive refracting power provided at the image side of said fourth lens group, wherein said fifth said lens group is held stationary during the zooming.

12. A zoom lens as claimed in claim 1, wherein said first lens sub-group of said third lens group is comprised of, in an order from the object side to the image side, a positive lens, a negative lens with a surface of concave shape at the image side, and a positive lens.

13. A zoom lens as claimed in claim 1, wherein said first lens sub-group of said third lens group is comprised of, in an order from the object side to the image side, a positive lens, a negative lens with a surface of concave shape at the image side, and a cemented lens having a positive lens and a negative lens cemented to each other.

14. A zoom lens as claimed in claim 1, wherein an image is formed on a solid-state image pickup device.

15. An image pickup apparatus comprising:
a zoom lens as recited in claim 1; and
a solid-state image pickup device configured to receive an image formed by said zoom lens.

16. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates,
wherein, when a focal length of said first lens group is denoted by f1 and a the focal length of the whole system at the wide-angle end is denoted by fw, a conditional expression $10.0 < f1/fw < 20.0$ is satisfied, and
wherein, when focal lengths of said first and third lens groups are denoted by f1 and f3, a conditional expression $2.5 < f1/f3 < 4.5$ is satisfied.

17. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates,
wherein, when a focal length of said first lens group is denoted by f1 and a the focal length of the whole system at the wide-angle end is denoted by fw, a conditional expression $10.0 < f1/fw < 20.0$ is satisfied, and wherein, when the focal length of the whole system at the wide-angle end and the telephoto end is denoted by fw and ft, respectively, a conditional expression 18.0<ft/fw<40.0 is satisfied.

18. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates,
wherein, when a focal length of said first lens group is denoted by f1 and a the focal length of the whole system at the wide-angle end is denoted by fw, a conditional expression 10.0<f1/fw<20.0 is satisfied, and
wherein said first lens group is comprised of three lenses which are, in an order from the object side to the image side, a negative lens, a positive lens and a positive lens.

19. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates,
wherein, when a focal length of said first lens group is denoted by f1 and a the focal length of the whole system at the wide-angle end is denoted by fw, a conditional expression 10.0<f1/fw<20.0 is satisfied, and
wherein said second lens group is comprised of four lenses which are, in an order from the object side to the image side, a negative lens, a negative lens, a negative lens and a positive lens.

20. A zoom lens comprising:
a first lens group of positive refracting power;
a second lens group of negative refracting power;
a third lens group of positive refracting power;
a fourth lens group of positive refracting power;
a fifth lens group of positive refracting power provided at the image side of said fourth lens group,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates, and
wherein, when a focal length of said first lens group is denoted by f1 and a the focal length of the whole system at the wide-angle end is denoted by fw, a conditional expression 10.0<f1/fw<20.0 is satisfied,
wherein said fifth said lens group is held stationary during the zooming.

21. A zoom lens comprising:
a first lens group of positive refracting power;
a second lens group of negative refracting power;
a third lens group of positive refracting power; and
a fourth lens group of positive refracting power,
wherein said first to fourth lens groups are provided in this order from an object side to an image side,
wherein, during zooming from a wide-angle end to a telephoto end, at least said first lens group moves,
wherein said third lens group includes, in an order from the object side to the image side, a first lens sub-group of positive refracting power and a second lens sub-group of negative refracting power,
wherein said second lens sub-group of said third lens group is comprised of a single negative lens,
wherein said first lens sub-group of said third lens group is moved to keep a perpendicular component relative to an optical axis to correct image blur to be produced when said zoom lens vibrates,
wherein, when a focal length of said first lens group is denoted by f1 and a the focal length of the whole system at the wide-angle end is denoted by fw, a conditional expression 10.0<f1/fw<20.0 is satisfied, and
wherein said first lens sub-group of said third lens group is comprised of, in an order from the object side to the image side, a positive lens, a negative lens with a surface of concave shape at the image side, and a cemented lens having a positive lens and a negative lens cemented to each other.

* * * * *